(12) United States Patent
Langovsky

(10) Patent No.: US 8,330,381 B2
(45) Date of Patent: Dec. 11, 2012

(54) ELECTRONIC CIRCUIT FOR DC CONVERSION OF FLUORESCENT LIGHTING BALLAST

(75) Inventor: Nick Langovsky, Plymouth, MI (US)

(73) Assignee: Ilumisys, Inc., Troy, MI (US)

( * ) Notice: Subject to any disclaimer, the term of this patent is extended or adjusted under 35 U.S.C. 154(b) by 369 days.

(21) Appl. No.: 12/778,632

(22) Filed: May 12, 2010

(65) Prior Publication Data

US 2010/0289418 A1    Nov. 18, 2010

Related U.S. Application Data

(60) Provisional application No. 61/178,093, filed on May 14, 2009.

(51) Int. Cl.
*H05B 37/02* (2006.01)
*H05B 39/04* (2006.01)
*H05B 41/36* (2006.01)
(52) U.S. Cl. ............... 315/209 R; 315/200 R; 315/291; 315/307
(58) Field of Classification Search .................. None
See application file for complete search history.

(56) References Cited

U.S. PATENT DOCUMENTS

| | | | |
|---|---|---|---|
| D54,511 S | 2/1920 | Owen | |
| D58,105 S | 6/1921 | Poritz | |
| D79,814 S | 8/1929 | Hoch | |
| D80,419 S | 1/1930 | Kramer | |
| D84,763 S | 7/1931 | Stange | |
| D119,797 S | 4/1940 | Winkler et al. | |
| D125,312 S | 2/1941 | Logan | |
| 2,909,097 A | 10/1959 | Alden et al. | |
| 3,318,185 A | 5/1967 | Kott | |
| 3,561,719 A | 2/1971 | Grindle | |
| 3,586,936 A | 6/1971 | McLeroy | |

(Continued)

FOREIGN PATENT DOCUMENTS

CN          1584388 A       2/2005

(Continued)

OTHER PUBLICATIONS

Wolsey, Robert. Interoperable Systems: The Future of Lighting Control, Lighting Research Center, Jan. 1, 1997, vol. 2 No. 2, Rensselaer Polytechnic Institute, Troy, New York [online]. Retrieved Lighting Research Center Web Page using Internet <URL: http://www.lrc.rpi.edu/programs/Futures/LF-BAS/index.asp>.

(Continued)

*Primary Examiner* — Anh Tran
(74) *Attorney, Agent, or Firm* — Young Basile

(57) ABSTRACT

Embodiments of an illumination device including LEDs for connection to an existing fluorescent lamp fixture including a conventional ballast described. One illumination device includes protection circuitry configured to protect the illumination device from the ballast current signal, a full-wave rectifier, a smoothing filter electrically coupled to the full wave rectifier, and a current regulator power circuit electrically coupled to the smoothing filter and the LEDS. The current regulator power circuit can include a first switching element configured to operate in response to a first (PWM) ON/OFF control signal; a current controller electrically coupled to a gate of the first switching element, the current controller configured to generate the first PWM control signal; and a current sense resistor electrically coupled to the first switching element and configured to sense the current through the LEDS, wherein the sensed current is fed back to the current controller.

13 Claims, 5 Drawing Sheets

U.S. PATENT DOCUMENTS

| | | |
|---|---|---|
| 3,601,621 A | 8/1971 | Ritchie |
| 3,612,855 A | 10/1971 | Juhnke |
| 3,643,088 A | 2/1972 | Osteen et al. |
| 3,746,918 A | 7/1973 | Drucker et al. |
| 3,818,216 A | 6/1974 | Larraburu |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,974,637 A | 8/1976 | Bergey et al. |
| 3,993,386 A | 11/1976 | Rowe |
| 4,001,571 A | 1/1977 | Martin |
| 4,054,814 A | 10/1977 | Fegley et al. |
| 4,070,568 A | 1/1978 | Gala |
| 4,082,395 A | 4/1978 | Donato et al. |
| 4,096,349 A | 6/1978 | Donato |
| 4,102,558 A | 7/1978 | Krachman |
| 4,107,581 A | 8/1978 | Abernethy |
| 4,189,663 A | 2/1980 | Schmutzer et al. |
| 4,211,955 A | 7/1980 | Ray |
| 4,241,295 A | 12/1980 | Williams, Jr. |
| 4,262,255 A * | 4/1981 | Kokei et al. ................ 324/103 P |
| 4,271,408 A | 6/1981 | Teshima et al. |
| 4,272,689 A | 6/1981 | Crosby et al. |
| 4,273,999 A | 6/1981 | Pierpoint |
| 4,298,869 A | 11/1981 | Okuno |
| 4,329,625 A | 5/1982 | Nishizawa et al. |
| 4,339,788 A | 7/1982 | White et al. |
| 4,342,947 A | 8/1982 | Bloyd |
| 4,367,464 A | 1/1983 | Kurahashi et al. |
| D268,134 S | 3/1983 | Zurcher |
| 4,382,272 A | 5/1983 | Quella et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,394,719 A | 7/1983 | Moberg |
| 4,420,711 A | 12/1983 | Takahashi et al. |
| 4,455,562 A | 6/1984 | Dolan et al. |
| 4,500,796 A | 2/1985 | Quin |
| 4,581,687 A | 4/1986 | Nakanishi |
| 4,597,033 A | 6/1986 | Meggs et al. |
| 4,600,972 A | 7/1986 | MacIntyre |
| 4,607,317 A | 8/1986 | Lin |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,656,398 A | 4/1987 | Michael et al. |
| 4,661,890 A | 4/1987 | Watanabe et al. |
| 4,668,895 A | 5/1987 | Schneiter |
| 4,675,575 A | 6/1987 | Smith et al. |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,698,730 A | 10/1987 | Sakai et al. |
| 4,701,669 A | 10/1987 | Head et al. |
| 4,705,406 A | 11/1987 | Havel |
| 4,707,141 A | 11/1987 | Havel |
| D293,723 S | 1/1988 | Buttner |
| 4,727,289 A | 2/1988 | Uchida |
| 4,740,882 A | 4/1988 | Miller |
| 4,748,545 A | 5/1988 | Schmitt |
| 4,753,148 A | 6/1988 | Johnson |
| 4,758,173 A | 7/1988 | Northrop |
| 4,771,274 A | 9/1988 | Havel |
| 4,780,621 A | 10/1988 | Bartleucci et al. |
| 4,794,383 A | 12/1988 | Havel |
| 4,810,937 A | 3/1989 | Havel |
| 4,818,072 A | 4/1989 | Mohebban |
| 4,824,269 A | 4/1989 | Havel |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,857,801 A | 8/1989 | Farrell |
| 4,863,223 A | 9/1989 | Weissenbach et al. |
| 4,870,325 A | 9/1989 | Kazar |
| 4,874,320 A | 10/1989 | Freed et al. |
| 4,887,074 A | 12/1989 | Simon et al. |
| 4,894,832 A | 1/1990 | Colak |
| 4,901,207 A | 2/1990 | Sato et al. |
| 4,912,371 A | 3/1990 | Hamilton |
| 4,922,154 A | 5/1990 | Cacoub |
| 4,934,852 A | 6/1990 | Havel |
| 4,941,072 A | 7/1990 | Yasumoto et al. |
| 4,943,900 A | 7/1990 | Gartner |
| 4,962,687 A | 10/1990 | Belliveau et al. |
| 4,965,561 A | 10/1990 | Havel |
| 4,973,835 A | 11/1990 | Kurosu et al. |
| 4,979,081 A | 12/1990 | Leach et al. |
| 4,980,806 A | 12/1990 | Taylor et al. |
| 4,992,704 A | 2/1991 | Stinson |
| 5,003,227 A | 3/1991 | Nilssen |
| 5,008,595 A | 4/1991 | Kazar |
| 5,008,788 A | 4/1991 | Palinkas |
| 5,010,459 A | 4/1991 | Taylor et al. |
| 5,018,054 A | 5/1991 | Ohashi et al. |
| 5,027,037 A | 6/1991 | Wei |
| 5,027,262 A | 6/1991 | Freed |
| 5,032,960 A | 7/1991 | Katoh |
| 5,034,807 A | 7/1991 | Von Kohorn |
| 5,036,248 A | 7/1991 | McEwan et al. |
| 5,038,255 A | 8/1991 | Nishihashi et al. |
| 5,065,226 A | 11/1991 | Kluitmans et al. |
| 5,072,216 A | 12/1991 | Grange |
| 5,078,039 A | 1/1992 | Tulk et al. |
| 5,083,063 A | 1/1992 | Brooks |
| 5,088,013 A | 2/1992 | Revis |
| 5,089,748 A | 2/1992 | Ihms |
| 5,103,382 A | 4/1992 | Kondo et al. |
| 5,122,733 A | 6/1992 | Havel |
| 5,126,634 A | 6/1992 | Johnson |
| 5,128,595 A | 7/1992 | Hara |
| 5,130,909 A | 7/1992 | Gross |
| 5,134,387 A | 7/1992 | Smith et al. |
| 5,140,220 A | 8/1992 | Hasegawa |
| 5,142,199 A | 8/1992 | Elwell |
| 5,151,679 A | 9/1992 | Dimmick |
| 5,154,641 A | 10/1992 | McLaughlin |
| 5,161,879 A | 11/1992 | McDermott |
| 5,161,882 A | 11/1992 | Garrett |
| 5,164,715 A | 11/1992 | Kashiwabara et al. |
| 5,184,114 A | 2/1993 | Brown |
| 5,194,854 A | 3/1993 | Havel |
| 5,198,756 A | 3/1993 | Jenkins et al. |
| 5,209,560 A | 5/1993 | Taylor et al. |
| 5,220,250 A | 6/1993 | Szuba |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,278,542 A | 1/1994 | Smith et al. |
| 5,282,121 A | 1/1994 | Bornhorst et al. |
| 5,283,517 A | 2/1994 | Havel |
| 5,287,352 A | 2/1994 | Jackson et al. |
| 5,294,865 A | 3/1994 | Haraden |
| 5,298,871 A | 3/1994 | Shimohara |
| 5,301,090 A | 4/1994 | Hed |
| 5,303,124 A | 4/1994 | Wrobel |
| 5,307,295 A | 4/1994 | Taylor et al. |
| 5,321,593 A | 6/1994 | Moates |
| 5,323,226 A | 6/1994 | Schreder |
| 5,329,431 A | 7/1994 | Taylor et al. |
| 5,344,068 A | 9/1994 | Haessig |
| 5,350,977 A | 9/1994 | Hamamoto et al. |
| 5,357,170 A | 10/1994 | Luchaco et al. |
| 5,371,618 A | 12/1994 | Tai et al. |
| 5,374,876 A | 12/1994 | Horibata et al. |
| 5,375,043 A | 12/1994 | Tokunaga |
| D354,360 S | 1/1995 | Murata |
| 5,381,074 A | 1/1995 | Rudzewicz et al. |
| 5,388,357 A | 2/1995 | Malita |
| 5,402,702 A | 4/1995 | Hata |

| Patent No. | Date | Inventor(s) |
|---|---|---|
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |
| 5,412,552 A | 5/1995 | Fernandes |
| 5,420,482 A | 5/1995 | Phares |
| 5,421,059 A | 6/1995 | Leffers, Jr. |
| 5,430,356 A | 7/1995 | Ference et al. |
| 5,432,408 A | 7/1995 | Matsuda et al. |
| 5,436,535 A | 7/1995 | Yang |
| 5,436,853 A | 7/1995 | Shimohara |
| 5,450,301 A | 9/1995 | Waltz et al. |
| 5,461,188 A | 10/1995 | Drago et al. |
| 5,463,280 A | 10/1995 | Johnson |
| 5,463,502 A | 10/1995 | Savage, Jr. |
| 5,465,144 A | 11/1995 | Parker et al. |
| 5,475,300 A | 12/1995 | Havel |
| 5,489,827 A | 2/1996 | Xia |
| 5,491,402 A | 2/1996 | Small |
| 5,493,183 A | 2/1996 | Kimball |
| 5,504,395 A | 4/1996 | Johnson et al. |
| 5,506,760 A | 4/1996 | Giebler et al. |
| 5,513,082 A | 4/1996 | Asano |
| 5,519,496 A | 5/1996 | Borgert et al. |
| 5,530,322 A | 6/1996 | Ference et al. |
| 5,544,809 A | 8/1996 | Keating et al. |
| 5,545,950 A | 8/1996 | Cho |
| 5,550,440 A | 8/1996 | Allison et al. |
| 5,559,681 A | 9/1996 | Duarte |
| 5,561,346 A | 10/1996 | Byrne |
| D376,030 S | 11/1996 | Cohen |
| 5,575,459 A | 11/1996 | Anderson |
| 5,575,554 A | 11/1996 | Guritz |
| 5,581,158 A | 12/1996 | Quazi |
| 5,592,051 A | 1/1997 | Korkala |
| 5,592,054 A | 1/1997 | Nerone et al. |
| 5,600,199 A | 2/1997 | Martin, Sr. et al. |
| 5,607,227 A | 3/1997 | Yasumoto et al. |
| 5,608,290 A | 3/1997 | Hutchisson et al. |
| 5,614,788 A | 3/1997 | Mullins et al. |
| 5,621,282 A | 4/1997 | Haskell |
| 5,621,603 A | 4/1997 | Adamec et al. |
| 5,621,662 A | 4/1997 | Humphries et al. |
| 5,622,423 A | 4/1997 | Lee |
| 5,633,629 A | 5/1997 | Hochstein |
| 5,634,711 A | 6/1997 | Kennedy et al. |
| 5,640,061 A | 6/1997 | Bornhorst et al. |
| 5,640,141 A | 6/1997 | Myllymaki |
| 5,642,129 A | 6/1997 | Zavracky et al. |
| 5,655,830 A | 8/1997 | Ruskouski |
| 5,656,935 A | 8/1997 | Havel |
| 5,661,374 A | 8/1997 | Cassidy et al. |
| 5,661,645 A | 8/1997 | Hochstein |
| 5,673,059 A | 9/1997 | Zavracky et al. |
| 5,682,103 A | 10/1997 | Burrell |
| 5,688,042 A | 11/1997 | Madadi et al. |
| 5,697,695 A | 12/1997 | Lin et al. |
| 5,701,058 A | 12/1997 | Roth |
| 5,712,650 A | 1/1998 | Barlow |
| 5,721,471 A | 2/1998 | Begemann et al. |
| 5,725,148 A | 3/1998 | Hartman |
| 5,726,535 A | 3/1998 | Yan |
| 5,731,759 A | 3/1998 | Finucan |
| 5,734,590 A | 3/1998 | Tebbe |
| 5,751,118 A | 5/1998 | Mortimer |
| 5,752,766 A | 5/1998 | Bailey et al. |
| 5,765,940 A | 6/1998 | Levy et al. |
| 5,769,527 A | 6/1998 | Taylor et al. |
| 5,784,006 A | 7/1998 | Hochstein |
| 5,785,227 A | 7/1998 | Akiba |
| 5,790,329 A | 8/1998 | Klaus et al. |
| 5,803,579 A | 9/1998 | Turnbull et al. |
| 5,803,580 A | 9/1998 | Tseng |
| 5,803,729 A | 9/1998 | Tsimerman |
| 5,806,965 A | 9/1998 | Deese |
| 5,808,689 A | 9/1998 | Small |
| 5,810,463 A | 9/1998 | Kawahara et al. |
| 5,812,105 A | 9/1998 | Van de Ven |
| 5,813,751 A | 9/1998 | Shaffer |
| 5,813,753 A | 9/1998 | Vriens et al. |
| 5,821,695 A | 10/1998 | Vilanilam et al. |
| 5,825,051 A | 10/1998 | Bauer et al. |
| 5,828,178 A | 10/1998 | York et al. |
| 5,836,676 A | 11/1998 | Ando et al. |
| 5,848,837 A | 12/1998 | Gustafson |
| 5,850,126 A | 12/1998 | Kanbar |
| 5,851,063 A | 12/1998 | Doughty et al. |
| 5,852,658 A | 12/1998 | Knight et al. |
| 5,854,542 A | 12/1998 | Forbes |
| RE36,030 E | 1/1999 | Nadeau |
| 5,859,508 A | 1/1999 | Ge et al. |
| 5,865,529 A | 2/1999 | Yan |
| 5,890,794 A | 4/1999 | Abtahi et al. |
| 5,896,010 A | 4/1999 | Mikolajczak et al. |
| 5,907,742 A | 5/1999 | Johnson et al. |
| 5,912,653 A | 6/1999 | Fitch |
| 5,921,660 A | 7/1999 | Yu |
| 5,924,784 A | 7/1999 | Chliwnyj et al. |
| 5,927,845 A | 7/1999 | Gustafson et al. |
| 5,934,792 A | 8/1999 | Camarota |
| 5,943,802 A | 8/1999 | Tijanic |
| 5,946,209 A | 8/1999 | Eckel et al. |
| 5,949,347 A | 9/1999 | Wu |
| 5,952,680 A | 9/1999 | Strite |
| 5,959,547 A | 9/1999 | Tubel et al. |
| 5,962,989 A | 10/1999 | Baker |
| 5,962,992 A | 10/1999 | Huang et al. |
| 5,963,185 A | 10/1999 | Havel |
| 5,974,553 A | 10/1999 | Gandar |
| 5,980,064 A | 11/1999 | Metroyanis |
| 5,998,925 A | 12/1999 | Shimizu et al. |
| 5,998,928 A | 12/1999 | Hipp |
| 6,007,209 A | 12/1999 | Pelka |
| 6,008,783 A | 12/1999 | Kitagawa et al. |
| 6,011,691 A | 1/2000 | Schreffler |
| 6,016,038 A | 1/2000 | Mueller et al. |
| 6,018,237 A | 1/2000 | Havel |
| 6,019,493 A | 2/2000 | Kuo et al. |
| 6,020,825 A | 2/2000 | Chansky et al. |
| 6,025,550 A | 2/2000 | Kato |
| 6,028,694 A | 2/2000 | Schmidt |
| 6,030,099 A | 2/2000 | McDermott |
| 6,031,343 A | 2/2000 | Recknagel et al. |
| D422,737 S | 4/2000 | Orozco |
| 6,056,420 A | 5/2000 | Wilson et al. |
| 6,068,383 A | 5/2000 | Robertson et al. |
| 6,069,597 A | 5/2000 | Hansen |
| 6,072,280 A | 6/2000 | Allen |
| 6,084,359 A | 7/2000 | Hetzel et al. |
| 6,086,220 A | 7/2000 | Lash et al. |
| 6,091,200 A | 7/2000 | Lenz |
| 6,092,915 A | 7/2000 | Rensch |
| 6,095,661 A | 8/2000 | Lebens et al. |
| 6,097,352 A | 8/2000 | Zavracky et al. |
| 6,116,748 A | 9/2000 | George |
| 6,121,875 A | 9/2000 | Hamm et al. |
| 6,127,783 A | 10/2000 | Pashley et al. |
| 6,132,072 A | 10/2000 | Turnbull et al. |
| 6,135,604 A | 10/2000 | Lin |
| 6,139,174 A | 10/2000 | Butterworth |
| 6,149,283 A | 11/2000 | Conway et al. |
| 6,150,774 A | 11/2000 | Mueller et al. |
| 6,151,529 A | 11/2000 | Batko |
| 6,153,985 A | 11/2000 | Grossman |
| 6,158,882 A | 12/2000 | Bischoff, Jr. |
| 6,166,496 A | 12/2000 | Lys et al. |
| 6,175,201 B1 | 1/2001 | Sid |
| 6,175,220 B1 | 1/2001 | Billig et al. |
| 6,181,126 B1 | 1/2001 | Havel |
| 6,183,086 B1 | 2/2001 | Neubert |
| 6,183,104 B1 | 2/2001 | Ferrara |
| 6,184,628 B1 | 2/2001 | Ruthenberg |
| 6,196,471 B1 | 3/2001 | Ruthenberg |
| 6,203,180 B1 | 3/2001 | Fleischmann |
| 6,211,626 B1 | 4/2001 | Lys et al. |
| 6,215,409 B1 | 4/2001 | Blach |
| 6,217,190 B1 | 4/2001 | Altman et al. |
| 6,219,239 B1 | 4/2001 | Mellberg et al. |

| | | |
|---|---|---|
| 6,227,679 B1 | 5/2001 | Zhang et al. |
| 6,238,075 B1 | 5/2001 | Dealey, Jr. et al. |
| 6,241,359 B1 | 6/2001 | Lin |
| 6,250,774 B1 | 6/2001 | Begemann et al. |
| 6,252,350 B1 | 6/2001 | Alvarez |
| 6,252,358 B1 | 6/2001 | Xydis et al. |
| 6,268,600 B1 | 7/2001 | Nakamura et al. |
| 6,273,338 B1 | 8/2001 | White |
| 6,275,397 B1 | 8/2001 | McClain |
| 6,283,612 B1 | 9/2001 | Hunter |
| 6,292,901 B1 | 9/2001 | Lys et al. |
| 6,293,684 B1 | 9/2001 | Riblett |
| 6,297,724 B1 | 10/2001 | Bryans et al. |
| 6,305,109 B1 | 10/2001 | Lee |
| 6,305,821 B1 | 10/2001 | Hsieh et al. |
| 6,307,331 B1 | 10/2001 | Bonasia et al. |
| 6,310,590 B1 | 10/2001 | Havel |
| 6,323,832 B1 | 11/2001 | Nishizawa et al. |
| 6,325,651 B1 | 12/2001 | Nishihara et al. |
| 6,334,699 B1 | 1/2002 | Gladnick |
| 6,340,868 B1 | 1/2002 | Lys et al. |
| 6,354,714 B1 | 3/2002 | Rhodes |
| 6,361,186 B1 | 3/2002 | Slayden |
| 6,369,525 B1 | 4/2002 | Chang et al. |
| 6,371,637 B1 | 4/2002 | Atchinson et al. |
| 6,379,022 B1 | 4/2002 | Amerson et al. |
| D457,667 S | 5/2002 | Piepgras et al. |
| D457,669 S | 5/2002 | Piepgras et al. |
| D457,974 S | 5/2002 | Piepgras et al. |
| 6,388,393 B1 | 5/2002 | Illingworth |
| 6,394,623 B1 | 5/2002 | Tsui |
| D458,395 S | 6/2002 | Piepgras et al. |
| 6,400,096 B1 | 6/2002 | Wells et al. |
| 6,404,131 B1 | 6/2002 | Kawano et al. |
| 6,411,022 B1 | 6/2002 | Machida |
| 6,422,716 B2 | 7/2002 | Henrici et al. |
| 6,428,189 B1 | 8/2002 | Hochstein |
| D463,610 S | 9/2002 | Piepgras et al. |
| 6,445,139 B1 | 9/2002 | Marshall et al. |
| 6,448,550 B1 | 9/2002 | Nishimura |
| 6,448,716 B1 | 9/2002 | Hutchison |
| 6,459,919 B1 | 10/2002 | Lys et al. |
| 6,469,457 B2 | 10/2002 | Callahan |
| 6,471,388 B1 | 10/2002 | Marsh |
| 6,472,823 B2 | 10/2002 | Yen |
| 6,473,002 B1 | 10/2002 | Hutchison |
| D468,035 S | 12/2002 | Blanc et al. |
| 6,488,392 B1 | 12/2002 | Lu |
| 6,495,964 B1 | 12/2002 | Muthu et al. |
| 6,527,411 B1 | 3/2003 | Sayers |
| 6,528,954 B1 | 3/2003 | Lys et al. |
| 6,528,958 B2 | 3/2003 | Hulshof et al. |
| 6,538,375 B1 | 3/2003 | Duggal et al. |
| 6,548,967 B1 | 4/2003 | Dowling et al. |
| 6,568,834 B1 | 5/2003 | Scianna |
| 6,573,536 B1 | 6/2003 | Dry |
| 6,577,072 B2 | 6/2003 | Saito et al. |
| 6,577,080 B2 | 6/2003 | Lys et al. |
| 6,577,512 B2 | 6/2003 | Tripathi et al. |
| 6,577,794 B1 | 6/2003 | Currie et al. |
| 6,578,979 B2 | 6/2003 | Truttmann-Battig |
| 6,582,103 B1 | 6/2003 | Popovich et al. |
| 6,583,550 B2 | 6/2003 | Iwasa et al. |
| 6,583,573 B2 | 6/2003 | Bierman |
| 6,585,393 B1 | 7/2003 | Brandes et al. |
| 6,586,890 B2 | 7/2003 | Min et al. |
| 6,590,343 B2 | 7/2003 | Pederson |
| 6,592,238 B2 | 7/2003 | Cleaver et al. |
| 6,596,977 B2 | 7/2003 | Muthu et al. |
| 6,598,996 B1 | 7/2003 | Lodhie |
| 6,608,453 B2 | 8/2003 | Morgan et al. |
| 6,608,614 B1 | 8/2003 | Johnson |
| 6,609,804 B2 | 8/2003 | Nolan et al. |
| 6,612,712 B2 | 9/2003 | Nepil |
| 6,612,717 B2 | 9/2003 | Yen |
| 6,621,222 B1 | 9/2003 | Hong |
| 6,623,151 B2 | 9/2003 | Pederson |
| 6,624,597 B2 | 9/2003 | Dowling et al. |
| D481,484 S | 10/2003 | Cuevas et al. |
| 6,634,770 B2 | 10/2003 | Cao |
| 6,634,779 B2 | 10/2003 | Reed |
| 6,636,003 B2 | 10/2003 | Rahm et al. |
| 6,639,349 B1 | 10/2003 | Bahadur |
| 6,641,284 B2 | 11/2003 | Stopa et al. |
| 6,659,622 B2 | 12/2003 | Katogi et al. |
| 6,660,935 B2 | 12/2003 | Southard et al. |
| 6,666,689 B1 | 12/2003 | Savage, Jr. |
| 6,667,623 B2 | 12/2003 | Bourgault et al. |
| 6,674,096 B2 | 1/2004 | Sommers |
| 6,676,284 B1 | 1/2004 | Wynne Willson |
| 6,679,621 B2 | 1/2004 | West et al. |
| 6,681,154 B2 | 1/2004 | Nierlich et al. |
| 6,682,205 B2 | 1/2004 | Lin |
| 6,683,419 B2 | 1/2004 | Kriparos |
| 6,700,136 B2 | 3/2004 | Guida |
| 6,712,486 B1 | 3/2004 | Popovich et al. |
| 6,717,376 B2 | 4/2004 | Lys et al. |
| 6,717,526 B2 | 4/2004 | Martineau et al. |
| 6,720,745 B2 | 4/2004 | Lys et al. |
| 6,726,348 B2 | 4/2004 | Gloisten |
| 6,741,324 B1 | 5/2004 | Kim |
| D491,678 S | 6/2004 | Piepgras |
| D492,042 S | 6/2004 | Piepgras |
| 6,744,223 B2 | 6/2004 | Laflamme et al. |
| 6,748,299 B1 | 6/2004 | Motoyama |
| 6,762,562 B2 | 7/2004 | Leong |
| 6,774,584 B2 | 8/2004 | Lys et al. |
| 6,777,891 B2 | 8/2004 | Lys et al. |
| 6,781,329 B2 | 8/2004 | Mueller et al. |
| 6,787,999 B2 | 9/2004 | Stimac et al. |
| 6,788,000 B2 | 9/2004 | Appelberg et al. |
| 6,788,011 B2 | 9/2004 | Mueller et al. |
| 6,791,840 B2 | 9/2004 | Chun |
| 6,796,680 B1 | 9/2004 | Showers et al. |
| 6,801,003 B2 | 10/2004 | Schanberger et al. |
| 6,803,732 B2 | 10/2004 | Kraus et al. |
| 6,806,659 B1 | 10/2004 | Mueller et al. |
| 6,814,470 B2 | 11/2004 | Rizkin et al. |
| 6,815,724 B2 | 11/2004 | Dry |
| 6,846,094 B2 | 1/2005 | Luk |
| 6,851,816 B2 | 2/2005 | Wu et al. |
| 6,851,832 B2 | 2/2005 | Tieszen |
| 6,853,150 B2 | 2/2005 | Clauberg et al. |
| 6,853,151 B2 | 2/2005 | Leong et al. |
| 6,853,563 B1 | 2/2005 | Yang et al. |
| 6,857,924 B2 | 2/2005 | Fu et al. |
| 6,860,628 B2 | 3/2005 | Robertson et al. |
| 6,866,401 B2 | 3/2005 | Sommers et al. |
| 6,869,204 B2 | 3/2005 | Morgan et al. |
| 6,871,981 B2 | 3/2005 | Alexanderson et al. |
| 6,874,924 B1 | 4/2005 | Hulse et al. |
| 6,879,883 B2 | 4/2005 | Motoyama |
| 6,882,111 B2 | 4/2005 | Kan et al. |
| 6,883,929 B2 | 4/2005 | Dowling |
| 6,883,934 B2 | 4/2005 | Kawakami et al. |
| 6,888,322 B2 | 5/2005 | Dowling et al. |
| 6,897,624 B2 | 5/2005 | Lys et al. |
| 6,909,239 B2 | 6/2005 | Gauna |
| 6,909,921 B1 | 6/2005 | Bilger |
| 6,918,680 B2 | 7/2005 | Seeberger |
| 6,921,181 B2 | 7/2005 | Yen |
| 6,936,968 B2 | 8/2005 | Cross et al. |
| 6,936,978 B2 | 8/2005 | Morgan et al. |
| 6,940,230 B2 | 9/2005 | Myron et al. |
| 6,948,829 B2 | 9/2005 | Verdes et al. |
| 6,957,905 B1 | 10/2005 | Pritchard et al. |
| 6,963,175 B2 | 11/2005 | Archenhold et al. |
| 6,964,501 B2 | 11/2005 | Ryan |
| 6,965,197 B2 | 11/2005 | Tyan et al. |
| 6,965,205 B2 | 11/2005 | Piepgras et al. |
| 6,967,448 B2 | 11/2005 | Morgan et al. |
| 6,969,179 B2 | 11/2005 | Sloan et al. |
| 6,969,186 B2 | 11/2005 | Sonderegger et al. |
| 6,969,954 B2 | 11/2005 | Lys |
| 6,975,079 B2 | 12/2005 | Lys et al. |
| 6,979,097 B2 | 12/2005 | Elam et al. |
| 6,982,518 B2 | 1/2006 | Chou et al. |
| 6,995,681 B2 | 2/2006 | Pederson |

| | | |
|---|---|---|
| 6,997,576 B1 | 2/2006 | Lodhie et al. |
| 7,004,603 B2 | 2/2006 | Knight |
| D518,218 S | 3/2006 | Roberge et al. |
| 7,008,079 B2 | 3/2006 | Smith |
| 7,014,336 B1 | 3/2006 | Ducharme et al. |
| 7,015,650 B2 | 3/2006 | McGrath |
| 7,018,063 B2 | 3/2006 | Michael et al. |
| 7,021,799 B2 | 4/2006 | Mizuyoshi |
| 7,021,809 B2 | 4/2006 | Iwasa et al. |
| 7,024,256 B2 | 4/2006 | Krzyzanowski et al. |
| 7,031,920 B2 | 4/2006 | Dowling et al. |
| 7,033,036 B2 | 4/2006 | Pederson |
| 7,038,398 B1 | 5/2006 | Lys et al. |
| 7,038,399 B2 | 5/2006 | Lys et al. |
| 7,042,172 B2 | 5/2006 | Dowling et al. |
| 7,048,423 B2 | 5/2006 | Stepanenko et al. |
| 7,049,761 B2 | 5/2006 | Timmermans et al. |
| 7,052,171 B1 | 5/2006 | Lefebvre et al. |
| 7,053,557 B2 | 5/2006 | Cross et al. |
| 7,064,498 B2 | 6/2006 | Dowling et al. |
| 7,064,674 B2 | 6/2006 | Pederson |
| 7,067,992 B2 | 6/2006 | Leong et al. |
| 7,077,978 B2 | 7/2006 | Setlur et al. |
| 7,080,927 B2 | 7/2006 | Feuerborn et al. |
| 7,086,747 B2 | 8/2006 | Nielson et al. |
| 7,088,014 B2 | 8/2006 | Nierlich et al. |
| 7,088,904 B2 | 8/2006 | Ryan, Jr. |
| 7,102,902 B1 | 9/2006 | Brown et al. |
| 7,113,541 B1 | 9/2006 | Lys et al. |
| 7,114,830 B2 | 10/2006 | Robertson et al. |
| 7,114,834 B2 | 10/2006 | Rivas et al. |
| 7,118,262 B2 | 10/2006 | Negley |
| 7,119,503 B2 | 10/2006 | Kemper |
| 7,121,679 B2 | 10/2006 | Fujimoto |
| 7,122,976 B1 | 10/2006 | Null et al. |
| 7,128,442 B2 | 10/2006 | Lee et al. |
| 7,128,454 B2 | 10/2006 | Kim et al. |
| D532,532 S | 11/2006 | Maxik |
| 7,132,635 B2 | 11/2006 | Dowling |
| 7,132,785 B2 | 11/2006 | Ducharme |
| 7,132,804 B2 | 11/2006 | Lys et al. |
| 7,135,824 B2 | 11/2006 | Lys et al. |
| 7,139,617 B1 | 11/2006 | Morgan et al. |
| 7,144,135 B2 | 12/2006 | Martin et al. |
| 7,153,002 B2 | 12/2006 | Kim et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,164,110 B2 | 1/2007 | Pitigoi-Aron et al. |
| 7,164,235 B2 | 1/2007 | Ito et al. |
| 7,165,863 B1 | 1/2007 | Thomas et al. |
| 7,165,866 B2 | 1/2007 | Li |
| 7,167,777 B2 | 1/2007 | Budike, Jr. |
| 7,168,843 B2 | 1/2007 | Striebel |
| D536,468 S | 2/2007 | Crosby |
| 7,178,941 B2 | 2/2007 | Roberge et al. |
| 7,180,252 B2 | 2/2007 | Lys et al. |
| D538,950 S | 3/2007 | Maxik |
| D538,952 S | 3/2007 | Maxik et al. |
| D538,962 S | 3/2007 | Elliott |
| 7,186,003 B2 | 3/2007 | Dowling et al. |
| 7,186,005 B2 | 3/2007 | Hulse |
| 7,187,141 B2 | 3/2007 | Mueller et al. |
| 7,190,126 B1 | 3/2007 | Paton |
| 7,192,154 B2 | 3/2007 | Becker |
| 7,198,387 B1 | 4/2007 | Gloisten et al. |
| 7,201,491 B2 | 4/2007 | Bayat et al. |
| 7,201,497 B2 | 4/2007 | Weaver, Jr. et al. |
| 7,202,613 B2 | 4/2007 | Morgan et al. |
| 7,204,615 B2 | 4/2007 | Arik et al. |
| 7,204,622 B2 | 4/2007 | Dowling et al. |
| 7,207,696 B1 | 4/2007 | Lin |
| 7,210,818 B2 | 5/2007 | Luk et al. |
| 7,210,957 B2 | 5/2007 | Mrakovich et al. |
| 7,211,959 B1 | 5/2007 | Chou |
| 7,213,934 B2 | 5/2007 | Zarian et al. |
| 7,217,004 B2 | 5/2007 | Park et al. |
| 7,217,012 B2 | 5/2007 | Southard et al. |
| 7,217,022 B2 | 5/2007 | Ruffin |
| 7,218,056 B1 | 5/2007 | Harwood |
| 7,218,238 B2 | 5/2007 | Right et al. |
| 7,220,015 B2 | 5/2007 | Dowling |
| 7,220,018 B2 | 5/2007 | Crabb et al. |
| 7,221,104 B2 | 5/2007 | Lys et al. |
| 7,221,110 B2 | 5/2007 | Sears et al. |
| 7,224,000 B2 | 5/2007 | Aanegola et al. |
| 7,226,189 B2 | 6/2007 | Lee et al. |
| 7,228,052 B1 | 6/2007 | Lin |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,236,366 B2 | 6/2007 | Chen |
| 7,237,924 B2 | 7/2007 | Martineau et al. |
| 7,237,925 B2 | 7/2007 | Mayer et al. |
| 7,239,532 B1 | 7/2007 | Hsu et al. |
| 7,241,038 B2 | 7/2007 | Naniwa et al. |
| 7,242,152 B2 | 7/2007 | Dowling et al. |
| 7,246,926 B2 | 7/2007 | Harwood |
| 7,246,931 B2 | 7/2007 | Hsieh et al. |
| 7,248,239 B2 | 7/2007 | Dowling et al. |
| 7,249,269 B1 | 7/2007 | Motoyama |
| 7,249,865 B2 | 7/2007 | Robertson |
| D548,868 S | 8/2007 | Roberge et al. |
| 7,252,408 B2 | 8/2007 | Mazzochette et al. |
| 7,253,566 B2 | 8/2007 | Lys et al. |
| 7,255,457 B2 | 8/2007 | Ducharme et al. |
| 7,255,460 B2 | 8/2007 | Lee |
| 7,256,554 B2 | 8/2007 | Lys |
| 7,258,458 B2 | 8/2007 | Mochiachvili et al. |
| 7,258,467 B2 | 8/2007 | Saccomanno et al. |
| 7,259,528 B2 | 8/2007 | Pilz |
| 7,262,439 B2 | 8/2007 | Setlur et al. |
| 7,264,372 B2 | 9/2007 | Maglica |
| 7,267,467 B2 | 9/2007 | Wu et al. |
| 7,270,443 B2 | 9/2007 | Kurtz et al. |
| 7,271,794 B1 | 9/2007 | Cheng et al. |
| 7,273,300 B2 | 9/2007 | Mrakovich |
| 7,274,045 B2 | 9/2007 | Chandran et al. |
| 7,274,160 B2 | 9/2007 | Mueller et al. |
| D553,267 S | 10/2007 | Yuen |
| 7,285,801 B2 | 10/2007 | Eliashevich et al. |
| 7,288,902 B1 | 10/2007 | Melanson |
| 7,296,912 B2 | 11/2007 | Beauchamp |
| 7,300,184 B2 | 11/2007 | Ichikawa et al. |
| 7,300,192 B2 | 11/2007 | Mueller et al. |
| D556,937 S | 12/2007 | Ly |
| D557,854 S | 12/2007 | Lewis |
| 7,303,300 B2 | 12/2007 | Dowling et al. |
| 7,306,353 B2 | 12/2007 | Popovich et al. |
| 7,307,391 B2 | 12/2007 | Shan |
| 7,308,296 B2 | 12/2007 | Lys et al. |
| 7,309,965 B2 | 12/2007 | Dowling et al. |
| 7,318,658 B2 | 1/2008 | Wang et al. |
| 7,319,244 B2 | 1/2008 | Liu et al. |
| 7,319,246 B2 | 1/2008 | Soules et al. |
| 7,321,191 B2 | 1/2008 | Setlur et al. |
| 7,326,964 B2 | 2/2008 | Lim et al. |
| 7,327,281 B2 | 2/2008 | Hutchison |
| 7,329,031 B2 | 2/2008 | Liaw et al. |
| D563,589 S | 3/2008 | Hariri et al. |
| 7,345,320 B2 | 3/2008 | Dahm |
| 7,348,604 B2 | 3/2008 | Matheson |
| 7,350,936 B2 | 4/2008 | Ducharme et al. |
| 7,350,952 B2 | 4/2008 | Nishigaki |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,358,679 B2 | 4/2008 | Lys et al. |
| 7,358,929 B2 | 4/2008 | Mueller et al. |
| 7,374,327 B2 | 5/2008 | Schexnaider |
| 7,385,359 B2 | 6/2008 | Dowling et al. |
| 7,391,159 B2 | 6/2008 | Harwood |
| 7,396,146 B2 | 7/2008 | Wang |
| 7,401,935 B2 | 7/2008 | VanderSchuit |
| 7,401,945 B2 | 7/2008 | Zhang |
| 7,427,840 B2 | 9/2008 | Morgan et al. |
| 7,429,117 B2 | 9/2008 | Pohlert et al. |

| | | | | | | |
|---|---|---|---|---|---|---|
| 7,434,964 B1 | 10/2008 | Zheng et al. | | 2003/0102810 A1 | 6/2003 | Cross et al. |
| 7,438,441 B2 | 10/2008 | Sun et al. | | 2003/0133292 A1 | 7/2003 | Mueller et al. |
| D580,089 S | 11/2008 | Ly et al. | | 2003/0137258 A1 | 7/2003 | Piepgras et al. |
| D581,556 S | 11/2008 | To et al. | | 2003/0185005 A1 | 10/2003 | Sommers et al. |
| 7,449,847 B2 | 11/2008 | Schanberger et al. | | 2003/0185014 A1 | 10/2003 | Gloisten |
| D582,577 S | 12/2008 | Yuen | | 2003/0189412 A1 | 10/2003 | Cunningham |
| D584,428 S | 1/2009 | Li et al. | | 2003/0222587 A1 | 12/2003 | Dowling, Jr. et al. |
| 7,476,002 B2 | 1/2009 | Wolf et al. | | 2004/0003545 A1 | 1/2004 | Gillespie |
| 7,476,004 B2 | 1/2009 | Chan | | 2004/0012959 A1 | 1/2004 | Robertson et al. |
| 7,478,924 B2 | 1/2009 | Robertson | | 2004/0036006 A1 | 2/2004 | Dowling |
| D586,484 S | 2/2009 | Liu et al. | | 2004/0037088 A1 | 2/2004 | English et al. |
| D586,928 S | 2/2009 | Liu et al. | | 2004/0052076 A1 | 3/2004 | Mueller et al. |
| 7,490,957 B2 | 2/2009 | Leong et al. | | 2004/0062041 A1 | 4/2004 | Cross et al. |
| 7,497,596 B2 | 3/2009 | Ge | | 2004/0075572 A1 | 4/2004 | Buschmann et al. |
| 7,507,001 B2 | 3/2009 | Kit | | 2004/0080960 A1 | 4/2004 | Wu |
| 7,510,299 B2 | 3/2009 | Timmermans et al. | | 2004/0090191 A1 | 5/2004 | Mueller et al. |
| 7,520,635 B2 | 4/2009 | Wolf et al. | | 2004/0090787 A1 | 5/2004 | Dowling et al. |
| 7,521,872 B2 | 4/2009 | Bruning | | 2004/0105261 A1 | 6/2004 | Ducharme et al. |
| 7,524,089 B2 | 4/2009 | Park | | 2004/0105264 A1 | 6/2004 | Spero |
| D592,766 S | 5/2009 | Zhu et al. | | 2004/0113568 A1 | 6/2004 | Dowling et al. |
| D593,223 S | 5/2009 | Komar | | 2004/0116039 A1 | 6/2004 | Mueller et al. |
| 7,534,002 B2 | 5/2009 | Yamaguchi et al. | | 2004/0124782 A1 | 7/2004 | Yu |
| 7,549,769 B2 | 6/2009 | Kim et al. | | 2004/0130909 A1 | 7/2004 | Mueller et al. |
| 7,556,396 B2 | 7/2009 | Kuo et al. | | 2004/0141321 A1 | 7/2004 | Dowling et al. |
| 7,572,030 B2 | 8/2009 | Booth et al. | | 2004/0155609 A1 | 8/2004 | Lys et al. |
| 7,575,339 B2 | 8/2009 | Hung | | 2004/0160199 A1 | 8/2004 | Morgan et al. |
| 7,579,786 B2 | 8/2009 | Soos | | 2004/0178751 A1 | 9/2004 | Mueller et al. |
| 7,583,035 B2 | 9/2009 | Shteynberg et al. | | 2004/0189218 A1 | 9/2004 | Leong et al. |
| 7,602,559 B2 | 10/2009 | Jang et al. | | 2004/0189262 A1 | 9/2004 | McGrath |
| 7,619,366 B2 | 11/2009 | Diederiks | | 2004/0212320 A1 | 10/2004 | Dowling et al. |
| 7,635,201 B2 | 12/2009 | Deng | | 2004/0212321 A1 | 10/2004 | Lys et al. |
| 7,639,517 B2 | 12/2009 | Zhou et al. | | 2004/0212993 A1 | 10/2004 | Morgan et al. |
| D612,528 S | 3/2010 | McGrath et al. | | 2004/0223328 A1 | 11/2004 | Lee et al. |
| 7,690,813 B2 | 4/2010 | Kanamori et al. | | 2004/0240890 A1 | 12/2004 | Lys et al. |
| 7,710,047 B2 | 5/2010 | Shteynberg et al. | | 2004/0251854 A1 | 12/2004 | Matsuda et al. |
| 7,712,918 B2 | 5/2010 | Siemiet et al. | | 2004/0257007 A1 | 12/2004 | Lys et al. |
| 7,828,471 B2 | 11/2010 | Lin | | 2005/0013133 A1 | 1/2005 | Yeh |
| 7,843,150 B2 | 11/2010 | Wang et al. | | 2005/0024877 A1 | 2/2005 | Frederick |
| 2001/0033488 A1 | 10/2001 | Chliwnyj et al. | | 2005/0030744 A1 | 2/2005 | Ducharme et al. |
| 2001/0045803 A1 | 11/2001 | Cencur | | 2005/0035728 A1 | 2/2005 | Schanberger et al. |
| 2002/0011801 A1 | 1/2002 | Chang | | 2005/0036300 A1 | 2/2005 | Dowling et al. |
| 2002/0038157 A1 | 3/2002 | Dowling et al. | | 2005/0040774 A1 | 2/2005 | Mueller et al. |
| 2002/0044066 A1 | 4/2002 | Dowling et al. | | 2005/0041161 A1 | 2/2005 | Dowling et al. |
| 2002/0047569 A1 | 4/2002 | Dowling et al. | | 2005/0041424 A1 | 2/2005 | Ducharme |
| 2002/0047624 A1 | 4/2002 | Stam et al. | | 2005/0043907 A1 | 2/2005 | Eckel et al. |
| 2002/0047628 A1 | 4/2002 | Morgan et al. | | 2005/0044617 A1 | 3/2005 | Mueller et al. |
| 2002/0048169 A1 | 4/2002 | Dowling et al. | | 2005/0047132 A1 | 3/2005 | Dowling et al. |
| 2002/0057061 A1 | 5/2002 | Mueller et al. | | 2005/0047134 A1 | 3/2005 | Mueller et al. |
| 2002/0060526 A1 | 5/2002 | Timmermans et al. | | 2005/0062440 A1 | 3/2005 | Lys et al. |
| 2002/0070688 A1 | 6/2002 | Dowling et al. | | 2005/0063194 A1 | 3/2005 | Lys et al. |
| 2002/0074559 A1 | 6/2002 | Dowling et al. | | 2005/0078477 A1 | 4/2005 | Lo |
| 2002/0078221 A1 | 6/2002 | Blackwell et al. | | 2005/0099824 A1 | 5/2005 | Dowling et al. |
| 2002/0101197 A1 | 8/2002 | Lys et al. | | 2005/0107694 A1 | 5/2005 | Jansen et al. |
| 2002/0113555 A1 | 8/2002 | Lys et al. | | 2005/0110384 A1 | 5/2005 | Peterson |
| 2002/0130627 A1 | 9/2002 | Morgan et al. | | 2005/0116667 A1 | 6/2005 | Mueller et al. |
| 2002/0145394 A1 | 10/2002 | Morgan et al. | | 2005/0128751 A1 | 6/2005 | Roberge et al. |
| 2002/0145869 A1 | 10/2002 | Dowling | | 2005/0141225 A1 | 6/2005 | Striebel |
| 2002/0152045 A1 | 10/2002 | Dowling et al. | | 2005/0151489 A1 | 7/2005 | Lys et al. |
| 2002/0152298 A1 | 10/2002 | Kikta et al. | | 2005/0151663 A1 | 7/2005 | Tanguay |
| 2002/0153851 A1 | 10/2002 | Morgan et al. | | 2005/0154494 A1 | 7/2005 | Ahmed |
| 2002/0158583 A1 | 10/2002 | Lys et al. | | 2005/0174473 A1 | 8/2005 | Morgan et al. |
| 2002/0163316 A1 | 11/2002 | Lys et al. | | 2005/0174780 A1 | 8/2005 | Park |
| 2002/0171365 A1 | 11/2002 | Morgan et al. | | 2005/0184667 A1 | 8/2005 | Sturman et al. |
| 2002/0171377 A1 | 11/2002 | Mueller et al. | | 2005/0201112 A1 | 9/2005 | Machi et al. |
| 2002/0171378 A1 | 11/2002 | Morgan et al. | | 2005/0206529 A1 | 9/2005 | St.-Germain |
| 2002/0176259 A1 | 11/2002 | Ducharme | | 2005/0213320 A1 | 9/2005 | Kazuhiro et al. |
| 2002/0179816 A1 | 12/2002 | Haines et al. | | 2005/0213352 A1 | 9/2005 | Lys |
| 2002/0195975 A1 | 12/2002 | Schanberger et al. | | 2005/0213353 A1 | 9/2005 | Lys |
| 2003/0011538 A1 | 1/2003 | Lys et al. | | 2005/0218838 A1 | 10/2005 | Lys |
| 2003/0028260 A1 | 2/2003 | Blackwell | | 2005/0218870 A1 | 10/2005 | Lys |
| 2003/0031015 A1 | 2/2003 | Ishibashi | | 2005/0219860 A1 | 10/2005 | Schexnaider |
| 2003/0057884 A1 | 3/2003 | Dowling et al. | | 2005/0219872 A1 | 10/2005 | Lys |
| 2003/0057886 A1 | 3/2003 | Lys et al. | | 2005/0225979 A1 | 10/2005 | Robertson et al. |
| 2003/0057887 A1 | 3/2003 | Dowling et al. | | 2005/0231133 A1 | 10/2005 | Lys |
| 2003/0057890 A1 | 3/2003 | Lys et al. | | 2005/0236029 A1 | 10/2005 | Dowling |
| 2003/0076281 A1 | 4/2003 | Morgan et al. | | 2005/0236998 A1 | 10/2005 | Mueller et al. |
| 2003/0085710 A1 | 5/2003 | Bourgault et al. | | 2005/0248299 A1 | 11/2005 | Chemel et al. |
| 2003/0095404 A1 | 5/2003 | Becks et al. | | 2005/0253533 A1 | 11/2005 | Lys et al. |
| 2003/0100837 A1 | 5/2003 | Lys et al. | | 2005/0259424 A1 | 11/2005 | Zampini, II et al. |

| | | |
|---|---|---|
| 2005/0265019 A1 | 12/2005 | Sommers et al. |
| 2005/0275626 A1 | 12/2005 | Mueller et al. |
| 2005/0276051 A1 | 12/2005 | Caudle et al. |
| 2005/0276053 A1 | 12/2005 | Nortrup et al. |
| 2005/0276064 A1 | 12/2005 | Wu et al. |
| 2005/0285547 A1 | 12/2005 | Piepgras et al. |
| 2006/0002110 A1 | 1/2006 | Dowling et al. |
| 2006/0012987 A9 | 1/2006 | Ducharme et al. |
| 2006/0012997 A1 | 1/2006 | Catalano et al. |
| 2006/0016960 A1 | 1/2006 | Morgan et al. |
| 2006/0022214 A1 | 2/2006 | Morgan et al. |
| 2006/0028155 A1 | 2/2006 | Young |
| 2006/0028837 A1 | 2/2006 | Mrakovich |
| 2006/0034078 A1 | 2/2006 | Kovacik et al. |
| 2006/0050509 A9 | 3/2006 | Dowling et al. |
| 2006/0050514 A1 | 3/2006 | Opolka |
| 2006/0076908 A1 | 4/2006 | Morgan et al. |
| 2006/0092640 A1 | 5/2006 | Li |
| 2006/0098077 A1 | 5/2006 | Dowling |
| 2006/0104058 A1 | 5/2006 | Chemel et al. |
| 2006/0109648 A1 | 5/2006 | Trenchard et al. |
| 2006/0109649 A1 | 5/2006 | Ducharme et al. |
| 2006/0109661 A1 | 5/2006 | Coushaine et al. |
| 2006/0126325 A1 | 6/2006 | Lefebvre et al. |
| 2006/0126338 A1 | 6/2006 | Mighetto |
| 2006/0132061 A1 | 6/2006 | McCormick et al. |
| 2006/0132323 A1 | 6/2006 | Grady, Jr. |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0170376 A1 | 8/2006 | Piepgras et al. |
| 2006/0192502 A1 | 8/2006 | Brown et al. |
| 2006/0193131 A1 | 8/2006 | McGrath et al. |
| 2006/0197661 A1 | 9/2006 | Tracy et al. |
| 2006/0198128 A1 | 9/2006 | Piepgras et al. |
| 2006/0208667 A1 | 9/2006 | Lys et al. |
| 2006/0220595 A1 | 10/2006 | Lu |
| 2006/0221606 A1 | 10/2006 | Dowling |
| 2006/0221619 A1 | 10/2006 | Nishigaki |
| 2006/0232974 A1 | 10/2006 | Lee et al. |
| 2006/0262516 A9 | 11/2006 | Dowling et al. |
| 2006/0262521 A1 | 11/2006 | Piepgras et al. |
| 2006/0262544 A1 | 11/2006 | Piepgras et al. |
| 2006/0262545 A1 | 11/2006 | Piepgras et al. |
| 2006/0273741 A1 | 12/2006 | Stalker, III |
| 2006/0274529 A1 | 12/2006 | Cao |
| 2006/0285325 A1 | 12/2006 | Ducharme et al. |
| 2007/0035255 A1 | 2/2007 | Shuster et al. |
| 2007/0035538 A1 | 2/2007 | Garcia et al. |
| 2007/0040516 A1 | 2/2007 | Chen |
| 2007/0041220 A1 | 2/2007 | Lynch |
| 2007/0047227 A1 | 3/2007 | Ducharme |
| 2007/0053182 A1 | 3/2007 | Robertson |
| 2007/0053208 A1 | 3/2007 | Justel et al. |
| 2007/0064419 A1 | 3/2007 | Gandhi |
| 2007/0070621 A1 | 3/2007 | Rivas et al. |
| 2007/0070631 A1 | 3/2007 | Huang et al. |
| 2007/0081423 A1 | 4/2007 | Chien |
| 2007/0086754 A1 | 4/2007 | Lys et al. |
| 2007/0086912 A1 | 4/2007 | Dowling et al. |
| 2007/0097678 A1 | 5/2007 | Yang |
| 2007/0109763 A1 | 5/2007 | Wolf et al. |
| 2007/0115658 A1 | 5/2007 | Mueller et al. |
| 2007/0115665 A1 | 5/2007 | Mueller et al. |
| 2007/0120594 A1 | 5/2007 | Balakrishnan et al. |
| 2007/0127234 A1 | 6/2007 | Jervey, III |
| 2007/0133202 A1 | 6/2007 | Huang et al. |
| 2007/0139938 A1 | 6/2007 | Petroski et al. |
| 2007/0145915 A1 | 6/2007 | Roberge et al. |
| 2007/0147046 A1 | 6/2007 | Arik et al. |
| 2007/0152797 A1 | 7/2007 | Chemel et al. |
| 2007/0153514 A1 | 7/2007 | Dowling et al. |
| 2007/0159828 A1 | 7/2007 | Wang |
| 2007/0165402 A1 | 7/2007 | Weaver, Jr. et al. |
| 2007/0173978 A1 | 7/2007 | Fein et al. |
| 2007/0177382 A1 | 8/2007 | Pritchard et al. |
| 2007/0182387 A1 | 8/2007 | Weirich |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0195527 A1 | 8/2007 | Russell |
| 2007/0195532 A1 | 8/2007 | Reisenauer et al. |
| 2007/0205712 A1 | 9/2007 | Radkov et al. |
| 2007/0206375 A1 | 9/2007 | Piepgras et al. |
| 2007/0211463 A1 | 9/2007 | Chevalier et al. |
| 2007/0228999 A1 | 10/2007 | Kit |
| 2007/0235751 A1 | 10/2007 | Radkov et al. |
| 2007/0236156 A1 | 10/2007 | Lys et al. |
| 2007/0237284 A1 | 10/2007 | Lys et al. |
| 2007/0240346 A1 | 10/2007 | Li et al. |
| 2007/0241657 A1 | 10/2007 | Radkov et al. |
| 2007/0242466 A1 | 10/2007 | Wu et al. |
| 2007/0247450 A1 | 10/2007 | Lee |
| 2007/0247842 A1 | 10/2007 | Zampini et al. |
| 2007/0247847 A1 | 10/2007 | Villard |
| 2007/0247851 A1 | 10/2007 | Villard |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0274070 A1 | 11/2007 | Wedell |
| 2007/0281520 A1 | 12/2007 | Insalaco et al. |
| 2007/0285926 A1 | 12/2007 | Maxik |
| 2007/0285933 A1 | 12/2007 | Southard et al. |
| 2007/0290625 A1 | 12/2007 | He et al. |
| 2007/0291483 A1 | 12/2007 | Lys |
| 2007/0296350 A1 | 12/2007 | Maxik et al. |
| 2008/0003664 A1 | 1/2008 | Tysoe et al. |
| 2008/0007945 A1 | 1/2008 | Kelly et al. |
| 2008/0012502 A1 | 1/2008 | Lys |
| 2008/0012506 A1 | 1/2008 | Mueller et al. |
| 2008/0013316 A1 | 1/2008 | Chiang |
| 2008/0013324 A1 | 1/2008 | Yu |
| 2008/0018261 A1 | 1/2008 | Kastner |
| 2008/0024067 A1 | 1/2008 | Ishibashi |
| 2008/0037226 A1 | 2/2008 | Shin et al. |
| 2008/0037245 A1 | 2/2008 | Chan |
| 2008/0037284 A1 | 2/2008 | Rudisill |
| 2008/0062680 A1 | 3/2008 | Timmermans et al. |
| 2008/0089075 A1 | 4/2008 | Hsu |
| 2008/0092800 A1 | 4/2008 | Smith et al. |
| 2008/0093615 A1 | 4/2008 | Lin et al. |
| 2008/0093998 A1 | 4/2008 | Dennery et al. |
| 2008/0094837 A1 | 4/2008 | Dobbins et al. |
| 2008/0130267 A1 | 6/2008 | Dowling et al. |
| 2008/0151535 A1 | 6/2008 | de Castris |
| 2008/0158871 A1 | 7/2008 | McAvoy et al. |
| 2008/0158887 A1 | 7/2008 | Zhu et al. |
| 2008/0164826 A1 | 7/2008 | Lys |
| 2008/0164827 A1 | 7/2008 | Lys |
| 2008/0164854 A1 | 7/2008 | Lys |
| 2008/0175003 A1 | 7/2008 | Tsou et al. |
| 2008/0180036 A1 | 7/2008 | Garrity et al. |
| 2008/0186704 A1 | 8/2008 | Chou et al. |
| 2008/0192436 A1 | 8/2008 | Peng et al. |
| 2008/0211386 A1 | 9/2008 | Choi et al. |
| 2008/0211419 A1 | 9/2008 | Garrity |
| 2008/0218993 A1 | 9/2008 | Li |
| 2008/0224629 A1 | 9/2008 | Melanson |
| 2008/0224636 A1 | 9/2008 | Melanson |
| 2008/0253125 A1 | 10/2008 | Kang et al. |
| 2008/0258647 A1 | 10/2008 | Scianna |
| 2008/0285257 A1 | 11/2008 | King |
| 2008/0285266 A1 | 11/2008 | Thomas |
| 2008/0290814 A1 | 11/2008 | Leong et al. |
| 2008/0291675 A1 | 11/2008 | Lin et al. |
| 2008/0315773 A1 | 12/2008 | Pang |
| 2008/0315784 A1 | 12/2008 | Tseng |
| 2009/0002995 A1 | 1/2009 | Lee et al. |
| 2009/0016063 A1 | 1/2009 | Hu |
| 2009/0021140 A1 | 1/2009 | Takasu et al. |
| 2009/0046473 A1 | 2/2009 | Tsai et al. |
| 2009/0052186 A1 | 2/2009 | Xue |
| 2009/0067182 A1 | 3/2009 | Hsu et al. |
| 2009/0086492 A1 | 4/2009 | Meyer |
| 2009/0091938 A1 | 4/2009 | Jacobson et al. |
| 2009/0140285 A1 | 6/2009 | Lin et al. |
| 2009/0175041 A1 | 7/2009 | Yuen et al. |

| | | | |
|---|---|---|---|
| 2009/0185373 A1 | 7/2009 | Grajcar | |
| 2009/0195186 A1 | 8/2009 | Guest et al. | |
| 2009/0196034 A1 | 8/2009 | Gherardini et al. | |
| 2009/0213588 A1 | 8/2009 | Manes | |
| 2009/0273926 A1 | 11/2009 | Deng | |
| 2009/0303720 A1 | 12/2009 | McGrath | |
| 2009/0316408 A1 | 12/2009 | Villard | |
| 2010/0008085 A1 | 1/2010 | Ivey et al. | |
| 2010/0019689 A1 | 1/2010 | Shan | |
| 2010/0027259 A1 | 2/2010 | Simon et al. | |
| 2010/0033095 A1* | 2/2010 | Sadwick | 315/51 |
| 2010/0033964 A1 | 2/2010 | Choi et al. | |
| 2010/0096992 A1 | 4/2010 | Yamamoto et al. | |
| 2010/0096998 A1 | 4/2010 | Beers | |
| 2010/0103664 A1 | 4/2010 | Simon et al. | |
| 2010/0109550 A1 | 5/2010 | Huda et al. | |
| 2010/0109558 A1 | 5/2010 | Chew | |
| 2010/0164404 A1 | 7/2010 | Shao et al. | |

FOREIGN PATENT DOCUMENTS

| | | |
|---|---|---|
| CN | 2766345 Y | 3/2006 |
| CN | 2869556 Y | 2/2007 |
| EP | 0013782 B1 | 3/1983 |
| EP | 0091172 A2 | 10/1983 |
| EP | 0124924 B1 | 9/1987 |
| EP | 0174699 B1 | 11/1988 |
| EP | 0197602 B1 | 11/1990 |
| EP | 0214701 B1 | 3/1992 |
| EP | 0262713 B1 | 6/1992 |
| EP | 0203668 B1 | 2/1993 |
| EP | 0272749 B1 | 8/1993 |
| EP | 0337567 B1 | 11/1993 |
| EP | 0390262 B1 | 12/1993 |
| EP | 0359329 B1 | 3/1994 |
| EP | 0403011 B1 | 4/1994 |
| EP | 0632511 A2 | 1/1995 |
| EP | 0432848 B1 | 4/1995 |
| EP | 0403001 B1 | 8/1995 |
| EP | 0525876 B1 | 5/1996 |
| EP | 0714556 B1 | 1/1999 |
| EP | 0458408 B1 | 9/1999 |
| EP | 0578302 B1 | 9/1999 |
| EP | 0723701 B1 | 1/2000 |
| EP | 0787419 B1 | 5/2001 |
| EP | 1195740 A2 | 4/2002 |
| EP | 1016062 B1 | 8/2002 |
| EP | 1195740 A3 | 1/2003 |
| EP | 1149510 B1 | 2/2003 |
| EP | 1056993 B1 | 3/2003 |
| EP | 0766436 B1 | 5/2003 |
| EP | 0924281 B1 | 5/2003 |
| EP | 0826167 B1 | 6/2003 |
| EP | 1147686 B1 | 1/2004 |
| EP | 1142452 B1 | 3/2004 |
| EP | 1145602 B1 | 3/2004 |
| EP | 1422975 A1 | 5/2004 |
| EP | 0890059 B1 | 6/2004 |
| EP | 1348319 B1 | 6/2005 |
| EP | 1037862 B1 | 7/2005 |
| EP | 1346609 B1 | 8/2005 |
| EP | 1321012 B1 | 12/2005 |
| EP | 1610593 A2 | 12/2005 |
| EP | 1624728 A1 | 2/2006 |
| EP | 1415517 B1 | 5/2006 |
| EP | 1415518 B1 | 5/2006 |
| EP | 1438877 B1 | 5/2006 |
| EP | 1166604 B1 | 6/2006 |
| EP | 1479270 B1 | 7/2006 |
| EP | 1348318 B1 | 8/2006 |
| EP | 1399694 B1 | 8/2006 |
| EP | 1461980 B1 | 10/2006 |
| EP | 1110120 B1 | 4/2007 |
| EP | 1440604 B1 | 4/2007 |
| EP | 1047903 B1 | 6/2007 |
| EP | 1500307 B1 | 6/2007 |
| EP | 0922305 B1 | 8/2007 |
| EP | 0922306 B1 | 8/2007 |
| EP | 1194918 B1 | 8/2007 |
| EP | 1048085 B1 | 11/2007 |
| EP | 1763650 B1 | 12/2007 |
| EP | 1776722 B1 | 1/2008 |
| EP | 1459599 B1 | 2/2008 |
| EP | 1887836 A2 | 2/2008 |
| EP | 1579733 B1 | 4/2008 |
| EP | 1145282 B1 | 7/2008 |
| EP | 1157428 B1 | 9/2008 |
| EP | 1000522 B1 | 12/2008 |
| EP | 1502483 B1 | 12/2008 |
| EP | 1576858 B1 | 12/2008 |
| EP | 1646092 B1 | 1/2009 |
| EP | 1579736 B1 | 2/2009 |
| EP | 1889519 B1 | 3/2009 |
| EP | 1537354 B1 | 4/2009 |
| EP | 1518445 B1 | 5/2009 |
| EP | 1337784 B1 | 6/2009 |
| EP | 1461982 B1 | 9/2009 |
| GB | 2215024 A | 9/1989 |
| GB | 2324901 A | 11/1998 |
| JP | 6-54103 U | 7/1994 |
| JP | H6-54103 | 7/1994 |
| JP | 7-249467 | 9/1995 |
| JP | 08-162677 | 6/1996 |
| JP | 11-135274 A | 5/1999 |
| JP | 2001-238272 A | 8/2001 |
| JP | 2002-141555 A | 5/2002 |
| JP | 3098271 U | 2/2004 |
| JP | 2004119078 A | 4/2004 |
| JP | 2004-335426 | 11/2004 |
| JP | 2005-158363 A | 6/2005 |
| JP | 2005-166617 A | 6/2005 |
| JP | 2005-347214 A | 12/2005 |
| JP | 2006-507641 A | 3/2006 |
| JP | 3139714 U | 2/2008 |
| JP | 2008186758 A | 8/2008 |
| JP | 2008-258124 A | 10/2008 |
| JP | 2008293753 A | 12/2008 |
| KR | 10-2004-0008244 A | 1/2004 |
| KR | 20-0430022 Y1 | 11/2006 |
| KR | 10-0781652 B1 | 12/2007 |
| KR | 100844538 B1 | 7/2008 |
| KR | 100888669 B1 | 3/2009 |
| TW | M337036 | 7/2008 |
| WO | 9906759 A1 | 2/1999 |
| WO | 99/10867 A1 | 3/1999 |
| WO | 99/31560 A2 | 6/1999 |
| WO | 9945312 A1 | 9/1999 |
| WO | 00/01067 A2 | 1/2000 |
| WO | 02/25842 A2 | 3/2002 |
| WO | 02/061330 A2 | 8/2002 |
| WO | 02/069306 A2 | 9/2002 |
| WO | 02/091805 A2 | 11/2002 |
| WO | 02/098182 A2 | 12/2002 |
| WO | 02/099780 A2 | 12/2002 |
| WO | 03/026358 A1 | 3/2003 |
| WO | 03/055273 A2 | 7/2003 |
| WO | 03/067934 A2 | 8/2003 |
| WO | 03/090890 A1 | 11/2003 |
| WO | 03/096761 A2 | 11/2003 |
| WO | 2004/021747 A2 | 3/2004 |
| WO | 2004/023850 A2 | 3/2004 |
| WO | 2004/032572 A2 | 4/2004 |
| WO | 2004057924 A1 | 7/2004 |
| WO | 2004/100624 A2 | 11/2004 |
| WO | 2005031860 A2 | 4/2005 |
| WO | 2005/052751 A2 | 6/2005 |
| WO | 2005/060309 A2 | 6/2005 |
| WO | 2005/084339 A2 | 9/2005 |
| WO | 2005/089293 A2 | 9/2005 |
| WO | 2005/089309 A2 | 9/2005 |
| WO | 2006/023149 A2 | 3/2006 |
| WO | 2006044328 A1 | 4/2006 |
| WO | 2006056120 A1 | 6/2006 |
| WO | 2006/093889 A2 | 9/2006 |
| WO | 2006/127666 A2 | 11/2006 |
| WO | 2006/127785 A2 | 11/2006 |
| WO | 2006/133272 A2 | 12/2006 |
| WO | 2006137686 A1 | 12/2006 |
| WO | 2007/081674 A1 | 7/2007 |

| | | | |
|---|---|---|---|
| WO | 2007/094810 A2 | 8/2007 | |
| WO | 2007090292 A1 | 8/2007 | |
| WO | 2008137460 A2 | 11/2008 | |
| WO | 9957945 A1 | 9/2009 | |
| WO | 2010/030509 A2 | 3/2010 | |

OTHER PUBLICATIONS

Experiment Electronic Ballast. Electronic Ballast for Fluorescent Lamps [online], Revised Fall of 2007. [Retrieved on Sep. 1, 1997]. Retrieved from Virginia Tech Web Page using Internet <URL: http://www.ece.vt.edu/ece3354/labs/ballast.pdf.>.

Truck-Lite, LEDSelect—LED, Model 35, Clearance & Marker Lighting, [online], [retrieved on Jan. 13, 2000] Retrieved from Truck-Lite Web Page using Internet <URL: http://trucklite.com/leds14.html>.

Truck-Lite, LEDSelect—LED, Super 44, Stop, Turn & Tail Lighting, [online], [retrieved on Jan. 13, 2000] Retrieved from Truck-Lite Web Page using Internet <URL: http://trucklite.com/leds2.html>.

Truck-Lite, LEDSelect—LED, Model 45, Stop, Turn & Tail Lighting [online], [retrieved on Jan. 13, 2000] Retrieved from Truck-Lite Web Page using Internet <URL: http://trucklite.com/leds4.html>.

Telecite Products & Services—Display Options, [online], [retrieved on Jan. 13, 2000] Retrieved from Telecite Web page using Internet <URL: http://www.telecite.com/en/products/options en.htm>.

Traffic Signal Products—Transportation Products Group, [online], [retrieved on Jan. 13, 2000] Retrieved from the Dialight Web Page using Internet <URL: http://www.dialight.com/trans.htm>.

LED Lights, Replacement LED lamps for any incandescent light, [online], [retrieved on Jan. 13, 2000] Retrieved from LED Lights Web Page using Internet <URL: http://www.ledlights.com/replac.htm>.

LEDtronics, LEDtronics Catalog, 1996, p. 10, LEDtronics, Torrance, California.

Piper. The Best Path to Efficiency. Building Operating Management, Trade Press Publishing Company May 2000 [online], [retrieved on Jan. 17, 2008]. Retrieved from Find Articles Web Page using Internet <URL:http://findarticles.com/p/articles/mi_qu3922/is_200005/ai_n8899499/>.

Henson, Keith. The Benefits of Building Systems Integration, Access Control & Security Systems Integration, Oct. 1, 2000, Penton Media. [online], [retrieved on Oct. 24, 2008] Retrieved from Security Solutions Web page using Internet <URL: http://securitysolutions.com/mag/security_benefits_building_systems/>.

Phason Electronic Control Systems, Light Level Controller (LLC) case study. Nov. 30, 2004. 3 pages, Phason Inc., Winnipeg, Manitoba, Canada.

Airport International. Fly High With Intelligent Airport Building and Security Solutions [online], [retrieved on Oct. 24, 2008]. Retrieved from Airport International web page using Internet <URL: http://www.airport-int.com/categories/airport-building-and-security-solutions/fly-high-with-intelligent-airport-building-and-security-solutions.html>.

D.N.A.-III, [online], [retrieved Mar. 10, 2009] Retrieved from the PLC Lighting Web Page using Internet <URL: http://www.plclighting.com/product_info.php?cPath=1&products_id=92>.

E20116-18 Larmes Collection, [online], [retrieved on Oct. 7, 2010] Retrieved from ET2 Contemporary Lighting using Internet <URL: http://www.et2online.com/proddetail.aspx?ItemID=E20116-18>.

E20112-22 Starburst Collection, [online], [retrieved on Jul. 10, 2010] Retrieved from ET2 Contemporary Lighting using Internet <URL: http://www.et2online.com/proddetail.aspx?ItemID=E20112-22>.

E20524-10 & E20525-10 Curva Collection, [online], [retrieved on Jul. 10, 2010] Retrieved from ET2 Contemporary Lighting using Internet <URL: http://www.et2online.com/proddetail.aspx?ItemID=E20524-10 & E20525-10>.

E22201-44 Esprit Collection, [online], [retrieved on Jul. 10, 2010] Retrieved from ET2 Contemporary Lighting using Internet <URL: http://www.et2online.com/proddetail.aspx?ItemID=E22201-44>.

E20743-09 Stealth Collection, [online], [retrieved on Jul. 10, 2010] Retrieved from ET2 Contemporary Lighting using Internet <URL: http://www.et2online.com/proddetail.aspx?ItemID=E20743-09>.

Spencer, Eugene. High Sales, Low Utilization. Green Intelligent Buildings, Feb. 1, 2007. [online]. Retrieved from Green Intelligent Buildings web page using Internet <URL: http://www.greenintelligentbuildings.com/CDA/IBT_Archive/BNP_GUID_9-5-2006_A_10000000000000056772>.

Sensor Switch, nLight Lighting Control System, [online], [retrieved on Jan. 11, 2008] Retrieved from Sensor Switch web page using Internet <URL: http://www.sensorsswitch.com>.

Six Strategies, [online], [retrieved on Jan. 11, 2008] Retrieved from Encelium Technologies Inc. Web Page using Internet <URL: http://www.encelium.com/products/strategies.html>.

Lawrence Berkeley National Labratory. Lighting Control System—Phase Cut Carrier. University of California, [online] [retrieved on Jan. 14, 2008] Retrieved from Lawrence Berkeley National Labratory web page using Internet <URL: http://www/lbl.gov/tt/techs/lbnl1871.html>.

Best Practice Guide—Commercial Office Buildings—Central HVAC System. [online], [Retrieved on Jan. 17, 2008] Retrieved from Flex Your Power Organization web page using Internet <URL: http://www.fypower.org/bpg/module.html?b=offices&m+Central HVAC Systems&s=Contr...>.

Cornell University. Light Canopy—Cornell University Solar Decathlon, [online], [retrieved on Jan. 17, 2008] Retrieved from Cornell University web page using Internet <URL: http://cusd.cornell.edu/cusd/web/index/php/page/show/section/Design/page/controls>.

PLC-96973-PLC Lighting Elegance Modern/Contemporary Pendant Light, [online], [retrieved on Feb. 27, 2009] Retrieved from the Arcadian Lighting Web Page using Internet <URL: http/www.arcadianlighting.com/plc-96978-pc.html>.

PLC-81756-AL "Fireball" Contemporary Pendant Light, [online], [retrieved on Feb. 27, 2009] Retrieved from the Arcadian Lighting Web Page using Internet <URL: http://www.arcadianlighting.com/plc-81756-al.html>.

Philips. Sense and Simplicity—Licensing program for LED Luminaires and Retrofits, Philips Intellectual Property & Standards, May 5, 2009.

International Search Report and Written Opinion dated Dec. 24, 2010 from the corresponding International Application No. PCT/US2010/034635 filed May 13, 2010.

* cited by examiner

US 8,330,381 B2

ELECTRONIC CIRCUIT FOR DC CONVERSION OF FLUORESCENT LIGHTING BALLAST

CROSS-REFERENCE TO RELATED APPLICATIONS

This application claims priority to U.S. Provisional Patent Application Ser. No. 61/178,093, filed May 14, 2009, which is hereby incorporated by reference in its entirety.

TECHNICAL FIELD

The present invention relates in general to LED fluorescent lamp replacements.

BACKGROUND

Fluorescent lamps are commonly installed with an additional device to regulate the voltage and current provided to the fluorescent lamp. This device, known as a ballast, can be designed to provide the proper starting voltage to establish an arc between two electrodes of the fluorescent lamp. Additionally, the ballast can designed to provide a controlled voltage to limit the amount of current to the fluorescent lamp during operation thereof. The starting and operating voltages provided by the ballast to power the fluorescent lamp can depend on, for example, the length and/or diameter of the fluorescent lamp. Accordingly, a fluorescent lamp may contain a ballast particularly designed to provide the proper starting and operating voltages.

Fluorescent lamps are gradually being replaced by light-emitting diodes (LEDs) in many applications. LEDs have many advantages over traditional fluorescent lamps in that they have, for example, longer operational life, reduced power consumption, greater durability and increased design flexibility.

Accordingly, LED replacement lamps have been developed that retrofit fluorescent lamp fixtures using existing ballasts. These LED replacements commonly contain electrical circuitry for power conversion that may not be, for example, universally compatible with any type of ballast found in existing fixtures.

BRIEF SUMMARY

Embodiments of an illumination device including LEDs for connection to an existing fluorescent lamp fixture including a conventional ballast, the ballast configured to provide a current signal are disclosed herein. One such embodiment includes protection circuitry configured to protect the illumination device from the ballast current signal, a full-wave rectifier electrically coupled to the circuit protection means and configured to produce a rectified voltage output, a smoothing filter electrically coupled to the full wave rectifier and configured to produce a smoothed rectified voltage output and a current regulator power circuit electrically coupled to the smoothing filter and the LEDS. The current regulator power circuit includes a first switching element configured to operate in response to a first pulse width modulated (PWM) ON/OFF control signal, the first switching element delivering current to the LEDs in response to the ON control signal and the first switching element not delivering current to the LEDs in response to the OFF control signal. a current controller electrically coupled to a gate of the first switching element, the current controller configured to generate the first PWM control signal and a current sense resistor electrically coupled to the first switching element and configured to sense the current through the LEDS, wherein the sensed current is fed back to the current controller.

Embodiments of another illumination device including LEDs for connection to an existing fluorescent lamp fixture including a conventional ballast are disclosed herein. One such embodiment includes means for receiving a current signal from the conventional ballast and means for protecting the illumination device from the received current signal. The illumination device also includes means for rectifying the received current signal to produce a rectified voltage output and means for sensing the current through the LEDs. Further, the illumination device includes means for generating a pulse width modulated (PWM) control signal from a current control circuit based on the sensed current and means for supplying current to the LEDs in response to the PWM control signal so that the LED current reaches an average LED current.

Further, embodiments of a method of supplying power to an illumination device including LEDs and connected to an existing fluorescent lamp fixture including a conventional ballast are also disclosed herein. One such method includes receiving a current signal from the conventional ballast, protecting the illumination device from the received current signal, rectifying the received current signal to produce a rectified voltage output, sensing the current through the LEDs, generating a pulse width modulated (PWM) control signal from a current control circuit based on the sensed current and supplying current to the LEDs in response to the PWM control signal so that the LED current reaches an average LED current.

Other embodiments of the invention are described in additional detail hereinafter.

BRIEF DESCRIPTION OF THE DRAWING

The various features, advantages and other uses of the present invention will become more apparent by referring to the following detailed description and drawing in which.

DETAILED DESCRIPTION

Figure 1:
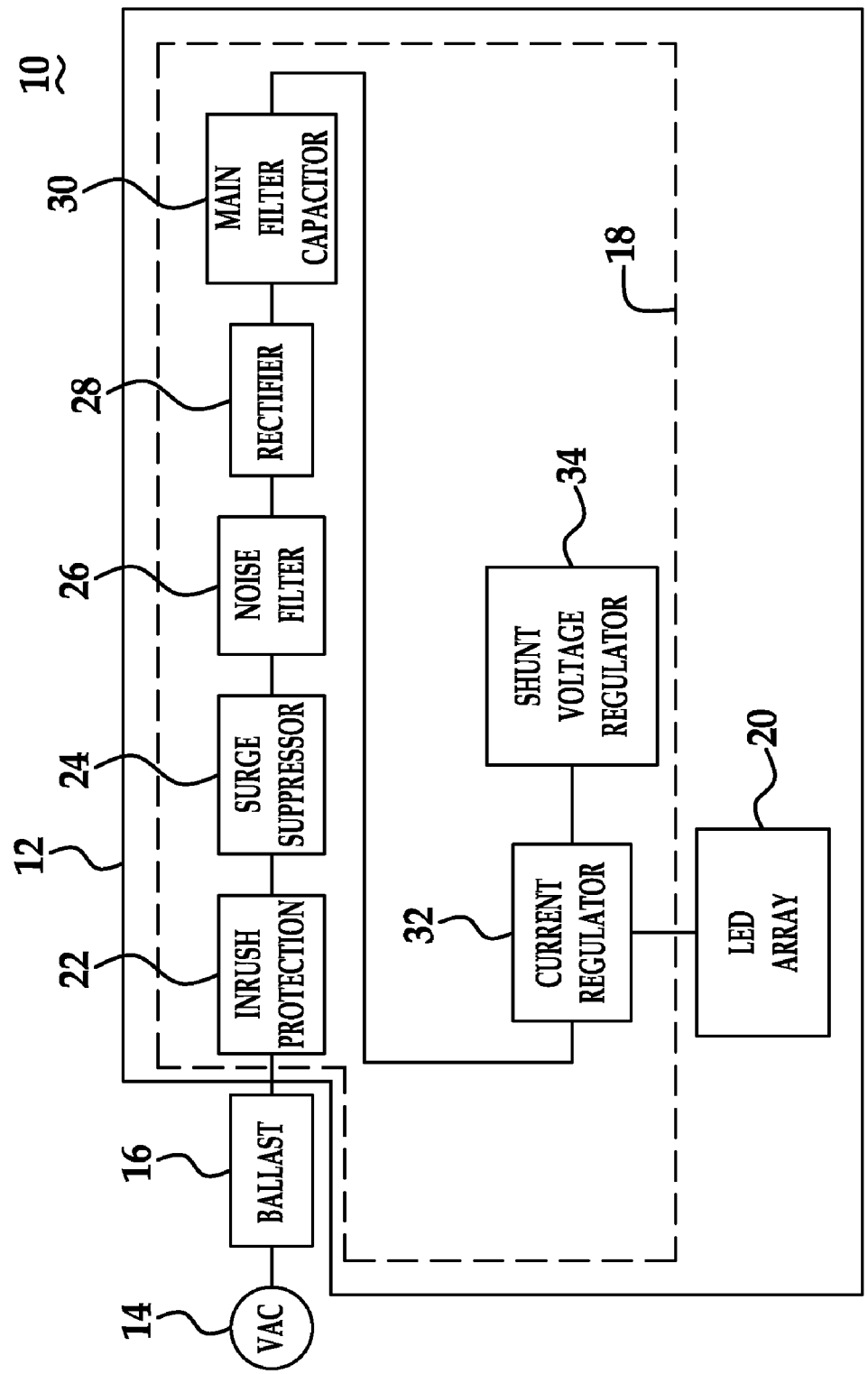
FIG. 1 is a block diagram of a light system containing a power converter in accordance with an embodiment of the invention.

FIG. 1 is a block diagram of a light system 10 according to one embodiment of the invention. LED light system 10 can include a fixture (not shown) and an LED replacement lamp 12 powered by a signal source 14. The fixture can be, for example, an existing fluorescent lamp fixture that may have been previously used in a light system for a fluorescent lamp. According to the embodiments discussed herein, replacement lamp 12 can be retrofitted to the existing fixture. The fixture can contain a ballast 16, which can be connected between signal source 14 and replacement lamp 12. Replacement lamp 12 can include a power converter 18 and an LED array 20. Although the embodiments will be discussed with reference to a replacement lamp that solely contains LEDs, other embodiments of light system 10 do not have to be exclusively limited to LEDs. For example, other embodiments of light system 10 may contain a replacement lamp that contains a combination a fluorescent lamp and LEDs.

Signal source 14 can be any suitable alternating current (AC) source or direct current (DC) source. For example, signal source 14 can be a 110/220 VAC single phase direct connect. As discussed previously, signal source 14 provides power to ballast 16. Ballast 16 can convert the power from signal source 14 to a power level designed to activate and operate a fluorescent lamp. Ballast 16 can be any type of ballast suitable for lighting fluorescent lamps by, for example, modifying the electrical voltage and frequency levels of signal source 14. Some non-limiting examples of ballast 16 are rapid start electronic ballasts, instant start electronic ballasts, magnetic ballasts or a hybrid containing components of both the electric and magnetic ballasts.

Power converter 18 can receive the power output from the ballast, by, for example, leads from the ballast that would have previously been connected to the lamp sockets for a fluorescent lamp. Power converter 18 can convert the power output by the ballast into power usable by and suitable for LED array 20. Power converter 18 can include an inrush protection circuit 22, a surge suppressor circuit 24, a noise filter circuit 26, a rectifier circuit 28, a main filter circuit 30, a current regulator circuit 32 and a shunt voltage regulator circuit 34. Current regulator circuit 30 can be connected to LEDs 20. As will be described in additional detail, power converter 18 is suitably designed to receive a wide range of currents and/or voltages from ballast 16.

LEDs 20 in replacement lamp 12 can include at least one LED, a plurality of series-connected or parallel-connected LEDs, or an LED array. At least one LED array can include a plurality of LED arrays. Any type of LED may be used in LEDs 20. For example, LEDs can be high-brightness semiconductor LEDs, an organic light emitting diodes (OLEDs), semiconductor dies that produce light in response to current, light emitting polymers, electro-luminescent strips (EL) or the like.

Figure 2:
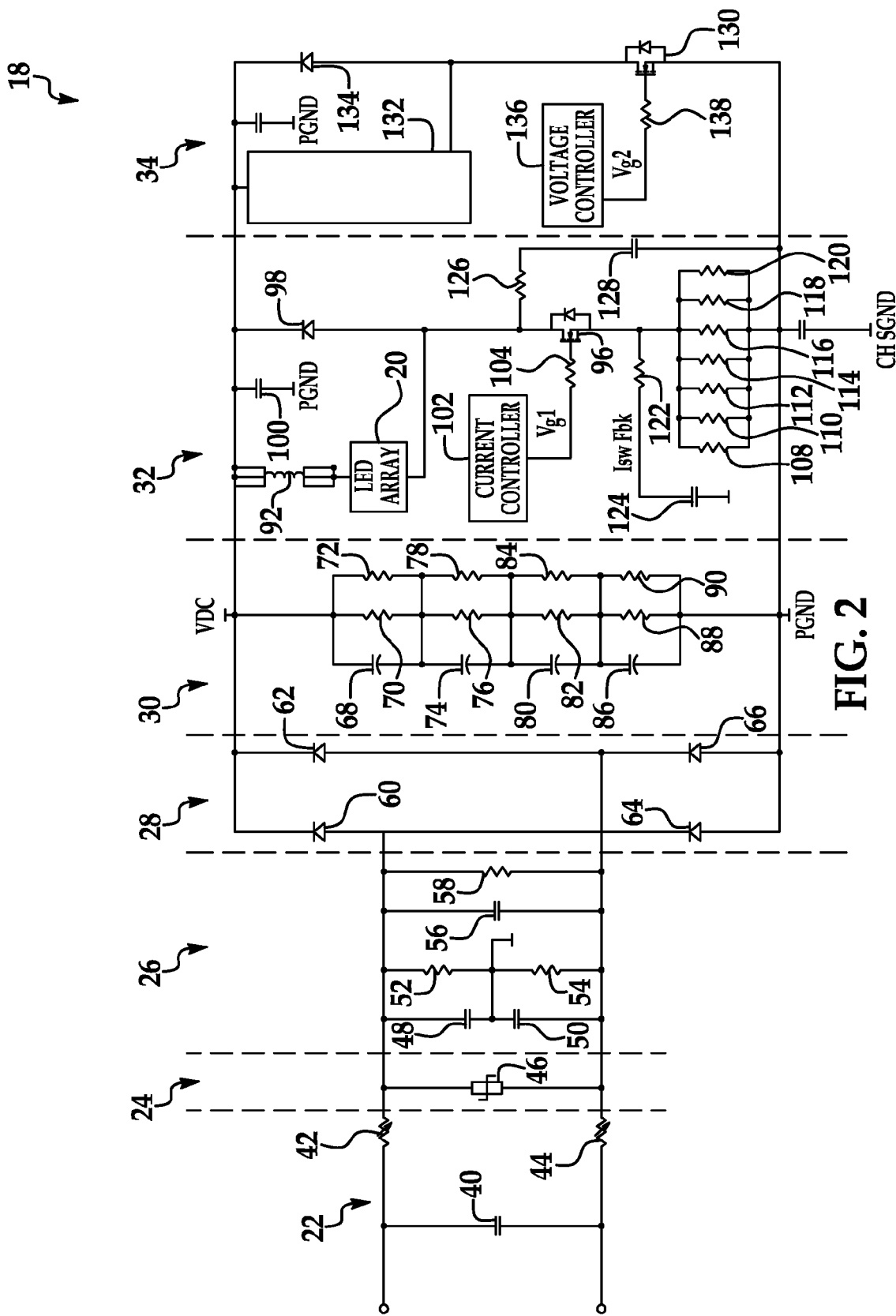
FIG. 2 is a circuit schematic illustrating various components of the power converter of FIG. 1.

FIG. 2 is a circuit schematic of illustrating various details of power converter 18 of FIG. 1. Signal source 14 can provide, for example, an AC signal to inrush protection circuit 22. Inrush protection circuit 22 can be realized by inrush current limiters 42 and 44. Capacitor 40 can be connected in parallel to output of the ballast 16 for filtering incoming voltage spikes. Inrush current limiter 40 can have one end connected to a common point between the output of ballast 16 and capacitor 40 for receiving the positive half cycle of the ballast output and the other end connected to surge suppressor circuit 24. Similarly, inrush current limiter 42 can have one end connected to a common point between the output of ballast 16 and capacitor 40 for receiving the negative half cycle of the ballast output and the other end connected to surge suppressor circuit 24.

When signal source 14 is initially connected, high inrush current can pass from the output of ballast 16 to components of power converter 18. High inrush currents may be moderated by placing inrush current limiters 42 and 44 in series with the current flow. In one embodiment, inrush current limiters 42 and 44 can be negative temperature coefficient (NTC) resistors. When signal source 14 is first connected, for example, NTC resistors can be cool and have a high resistance value thereby limiting inrush current. After a period of operation, NTC resistors can be warmed by current flowing therein, which in turn, can lower its resistance value. Alternate embodiments may use any other suitable inrush current limiter. One non-limiting example may be a fixed resistor or the like.

Selection of inrush current limiters 42 and 44 can be accomplished by, for example, calculating the maximum input energy the inrush current limiter will absorb when the device is turned on using equation (1):

$$E = \tfrac{1}{2} * C_{bus} * V_{max}^2; \text{ wherein} \tag{1}$$

E is the maximum energy rating;
$C_{bus}$ is the amount of bus capacitance; and
$V_{max}$ is the peak AC voltage or the maximum DC voltage.

Thus, for example, if $C_{bus}$ is 100 µF and $V_{max}$ is 1500 v, then the maximum energy rating will be 112.5 J. Accordingly, inrush current limiters 42 and 44 can be selected to have an energy rating greater than 112.5 J. Further, the resistance of the inrush current limiter can be of a value such that components of rectifier circuit 28 are not stressed. An example of an inrush current limiter that fulfils these preferences is Ametherm Inrush Current Limiter Part No. MS22212103, which contains a maximum energy rating of 220 J and a resistance of 120 ohms at 25° C. Other suitable inrush current limiters and techniques for selecting inrush current limiters are also available.

Referring still to FIG. 2, surge suppressor circuit 24 can be realized by varistor 46. Varistor 46 is connected in parallel between inrush protection circuit 22 and noise filter circuit 42. Varistor 46 can be used to absorb high voltage transients or surges that may occur from the output of ballast 16. Selection of varistor 46 can be accomplished by, for example, selecting a varistor that has a maximum allowable voltage no less than $V_{max}$, where $V_{max}$ is the peak AC voltage or the maximum DC voltage from the output of ballast 16. In this manner, varistor 46 will not clamp as long as the voltage does not exceed $V_{max}$. An example of a surge suppressor that fulfils these preferences is Panasonic ZNR Transient/Surge Absorber Part No. ERZV10D182CS, which has a maximum allowable voltage of 1000 $VAC_{rms}$ (1465 VDC). Other suitable surge suppressor devices and techniques for determining suitable surge suppressor devices are also available.

Incoming current passes through noise filter 26 to prevent noise interference from being received by power converter 18. Noise filter circuit 26 can be realized by X-class capacitor 56, Y-class capacitors 48 and 50 and discharge resistors 52, 54 and 56. Selection of the type and number of X-class capacitors can be accomplished by any suitable technique in order to, for example, pass EMC testing. One suitable technique is to select a specific capacitor, calculate the power dissipation of that capacitor and, if the calculated power dissipation for the selected capacitor is higher than the maximum allowed power dissipation for the specific capacitor, determining how many capacitors should be placed in parallel to achieve a power dissipation that is less than or equal to the maximum allowed power dissipation.

Accordingly, the RMS current of the X-class capacitor can be estimated, which as discussed in more detail below, to calculate the worst case power dissipation of X-class capacitor 56. RMS current of the X-class capacitor can be calculated using equations (2) and (3):

$$Z_c = \frac{1}{Cx \cdot 2 \cdot \pi \cdot Fb}; \text{ wherein} \quad (2)$$

$Z_c$ is the impedance of the X-class capacitor at the ballast switching frequency Fb;
Cx is the value of the X-class capacitor; and
Fb is the switching frequency of the ballast voltage.

$$Irms = \frac{\frac{4Vmax}{\pi \cdot \sqrt{2}}}{Z_c}; \text{ wherein} \quad (3)$$

Irms is the RMS current for the X-class capacitor;
Vmax is the peak AC voltage or the maximum DC voltage; and
$Z_c$ is the impedance of the X-class capacitor at the ballast switching frequency Fb.

In equation (3), Irms is found for the first harmonic of an input square wave. Alternatively, the RMS current for the X-class capacitor can be determined for a sinusoid, sawtooth or any other input waveform.

Once the type and value of X-class capacitor 56 is selected, X-class capacitor 56 can be evaluated based on its estimated power loss during operation of power converter 18 using equation (4) to determine the ESR of the X-class capacitor, equation (5) to determine the number of capacitors to place in parallel so that the power dissipation is less than the maximum allowable power dissipation and equation (6) to determine the estimated power loss of the X-class capacitor:

$$Resr = \frac{DF}{2 \cdot \pi \cdot f \cdot Cx}; \text{ wherein} \quad (4)$$

Resr is the theoretical equivalent series resistance of the X-class capacitor;
DF is the dissipation factor for the X-class capacitor;
f is the frequency at which the dissipation factor has been specified for the X-class capacitor; and
Cx is the value of the X-class capacitor.

$$n = \begin{vmatrix} n \leftarrow 1 \\ \text{while} \left(\frac{Irms}{n}\right)^2 \cdot Resr > Pc \\ n \leftarrow n + 1 \end{vmatrix} \quad (5)$$

n; wherein n is the number of X-class capacitors in parallel;
Irms is the RMS current for the X-class capacitor;
Resr is the equivalent series resistance of the X-class capacitor; and
Pc is the maximum allowed power dissipation value for the X-class capacitor.

$$Pesr_{max} = \left(\frac{Irms}{n}\right)^2 \cdot Resr; \text{ wherein} \quad (6)$$

$Pesr_{max}$ is the maximum power dissipation of an X-class capacitor;
Irms is the RMS current for an X-class capacitor;
Resr is the equivalent series resistance of an X-class capacitor; and
n is the number of X-class capacitors in parallel.

The ESR of the X-class capacitor determined by equation (4) may be different from the ESR at the operating frequency. Accordingly, the ESR at the operating frequency may be used to calculate the power dissipation of the X-class capacitor instead of the ESR of the X-class capacitor as determined by equation (4). An example of a suitable X-class capacitor 56 that can be used in noise filter 26 can have a value of 100 pF, a maximum allowed power dissipation of 0.25 W, and a DF of 0.001 at 1000 kHz. Other suitable capacitors and techniques for determining suitable capacitors for noise filter 26 are also available.

Rectifier 28 receives the filtered AC signal and outputs a rectified voltage using diodes 60, 62 64 and 66. Selection of diodes 60, 62 64 and 66 can be accomplished by, for example, selecting a type of diode that has a reverse voltage rating at least as high as Vmax so that the diode is able to withstand reverse voltages as high as the peak voltage or the maximum DC voltage. An example of a diode that fulfils these preferences is STMicroelectronics Part No. DTV1500SD, which has a maximum voltage rating of 1500V. Other suitable rectifier devices and techniques for determining suitable rectifier devices are also available.

The rectified voltage is smoothed by main filter 30, which is connected across rectifier 28. Main filter 30 can be realized electrolytic capacitor 68, 74, 80 and 86. Alternatively, main filter 30 can be realized by one or any other suitable number of capacitors. Electrolytic capacitors 68, 74, 80 and 86 act as a reservoir, supplying current to the output when the varying DC voltage from rectifier 28 is falling (i.e. resulting in a smoothed DC link voltage VDC). Selection of electrolytic capacitors can be accomplished by, for example, choosing a specific capacitor bus value (i.e. total electrolytic capacitance value) and verifying that this bus capacitance value permits the DC link voltage to be greater than the maximum LED forward voltage drop.

Figure 6:
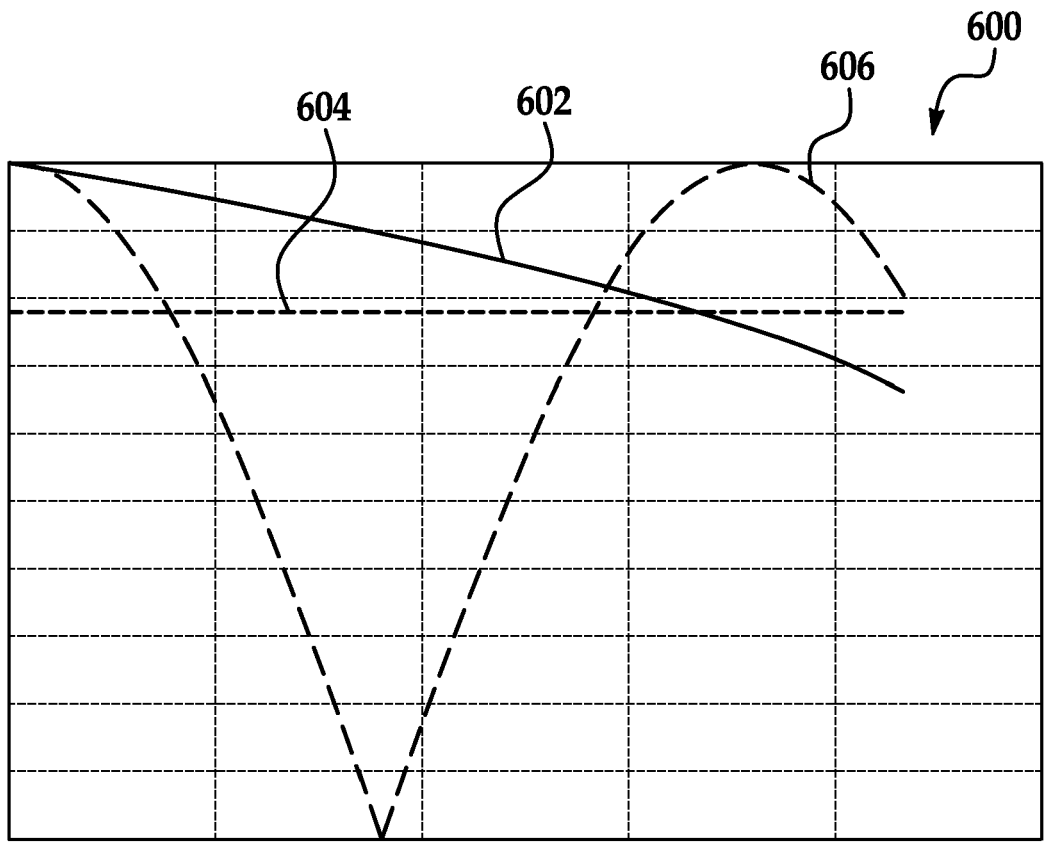
FIG. 6 is a circuit simulation waveform of an output forward voltage of an LED array along with a rectified DC voltage and a DC link voltage from the power converter of FIG. 2.

Referring to FIG. 6, a circuit simulation waveform 600 illustrates an example of how the selected bus capacitance value results in the DC link voltage (illustrated by a solid line 602) being greater than the maximum output forward voltage of LEDs 20 (illustrated by a dotted line 604) during both the charging and discharging of the selected bus capacitor. The point where DC link voltage and rectified output voltage (illustrated by a dashed line 606) intersect is greater than the maximum output forward voltage. If the selected bus capacitor did not begin recharging the DC link voltage, the DC link voltage would fall below the maximum output forward voltage. However, since the capacitor begins charging at the intersection point of the rising edge of the rectified output voltage, the DC link voltage does not fall below the maximum output forward voltage of LEDs 20. Accordingly, selection of a bus capacitance value, such as 100 μF, can fulfill these preferences and can also prevent the current regulator from entering discontinuous conduction mode. Other suitable bus capacitance values are also available. The maximum output forward voltage of LEDs 20, the rectified output voltage and DC link voltage can be represented using equations (7) and (8):

$$Vo_{max} = Vled_{max} \cdot Num_{leds}; \text{ wherein} \quad (7)$$

$Vo_{max}$ is the maximum output forward voltage of the series connected LEDs;
$Vled_{max}$ is the maximum LED forward voltage drop; and
$Num_{leds}$ is the number of series connected LEDs.

$$Vin(t, Vpk) = |Vpk \cdot \cos(\omega \cdot t)|; \text{ wherein} \quad (8)$$

Vin(t, Vpk) is the rectified output voltage;
Vpk is the peak voltage of the rectified output voltage;
ω is the fundamental frequency of the input waveform; and
t is the time.

The DC link voltage can be estimated and represented by using equations (9)-(12):

$$v_c(t) = \frac{1}{C_{bus}} \cdot \int_0^t -Idc \, d\tau; \text{ wherein} \quad (9)$$

$v_c(t)$ is the DC link voltage;
$C_{bus}$ is the bus capacitance;
Idc is the current drawn from the DC supply; and
t is the time. Finding the integral of equation (9) results in equation (10):

$$v_c(t) = \frac{-1}{C_{bus}} \cdot Idc \cdot t + C \quad (10)$$

Power converter 18 can keep constant power flowing out of the DC link voltage into LEDs 20 permitting Idc to increase as the DC link voltage decreases. Accordingly, equation (10) can also be represented as equation (11):

$$v_c(t) = \frac{1}{C_{bus}} \cdot \frac{-Po}{v_c(t)} \cdot t + C \quad (11)$$

Po is the output power of the LEDs. Solving for $v_c(t)$, results in equation (12):

$$v_c(t) = \frac{1}{2 \cdot C_{bus}} \cdot \left[ C \cdot C_{bus} + (C^2 \cdot C_{bus}^2 - 4 \cdot C_{bus} \cdot Po \cdot t)^{\frac{1}{2}} \right] \quad (12)$$

To solve equation (12) for the constant of integration, we can approximate a worst case value for C when the initial condition (i.e. t=0) of the DC link voltage is valid from the peak of the rectified voltage Vpk, which results equation (13):

$$v_c(t) = \frac{1}{2 \cdot C_{bus}} \cdot \left[ Vpk \cdot C_{bus} + (Vpk^2 \cdot C_{bus}^2 - 4 \cdot C_{bus} \cdot Po \cdot t)^{\frac{1}{2}} \right] \quad (13)$$

Once, the selected bus capacitance has been, realizable values can be selected for the capacitance. Selection of the type and number of capacitors in main filter 30 can be accomplished by any suitable technique in order to, for example, provide a DC link voltage that does not fall below the maximum output forward voltage of the LEDs 20. Preferably, capacitors should be able to sustain high voltages. By placing four capacitors 68, 74, 80 and 86 in series as shown in FIG. 2, main filter 30 can have a higher voltage rating.

However, if there is more than one capacitor in main filter capacitor 30, voltage may not be evenly distributed across each capacitor. Balancing resistors 70 and 72 can be placed in parallel with capacitor 68, balancing resistors 76 and 78 can be placed in parallel with capacitor 74, balancing resistors 82 and 84 can be placed in parallel with capacitor 80 and balancing resistors 88 and 90 can be placed in parallel with capacitor 86 so that each of the balancing resistors can assist in permitting capacitors 68 to assist capacitors 68, 74, 80 and 86 to share voltage evenly. Selection of the number and type of balancing resistors 70, 72, 76, 78, 82, 84, 88 and 90 can be accomplished by any suitable technique, such as by the resistors maximum voltage rating, and have any suitable value, such as 100 kΩ.

Current regulator power section 32 applies the DC link voltage across LEDs 20. Current regulator circuit 32 can be realized by inductor 92, low-side switch 96, diode 98, capacitor 100, current controller circuit 102, a gate resistor 104, sense resistors 108, 110, 112, 114, 116, 118 and 120, feedback resistor 122 and feedback capacitor 124. One end of LEDs 20 are connected to inductor 92 while the other end of LEDs 20 are connected to low-side switch 96. Diode 98 is connected in parallel to LEDs 20 and inductor 92 and prevents reverse currents from flowing through current regulator 32. Capacitor 100 is Switch 96 is connected and connected in series Current regulator power section 32 applies the DC link voltage across to LEDs 20. Alternatively, although only one inductor is shown in the circuit, more than one inductor can be implemented in series with inductor 92.

More specifically, inductor 92, connected in series with LEDs 20, provides the charging and discharging current to LEDs 20 according to the state of switch 96. As will be discussed in more detail below, the state of switch 96 is controlled by current controller 102.

Current regulator power section 32 utilizes a buck converter topology and can operate in a continuous conduction mode to convert DC link voltage to a desired LED drive voltage while providing a desired average LED current $I_L$ (also the average inductor current). During turn-on of switch 96, a function for current $i_{Lon}$ can be represented using equations (14)-(16):

$$v_{Lon}(t) = Lf \cdot \frac{d}{dt} i_{Lon}(t); \text{ wherein} \quad (14)$$

t is the time;
$v_{Lon}(t)$ is the inductor voltage at time t;
Lf is the value of the inductor(s); and
$i_{Lon}(t)$ is the inductor current at time t. Taking the integral of both sides of equation (14) results in equation (15):

$$i_{Lon}(t) = \frac{1}{Lf} \cdot \int_0^t (Vin - Vo) d\tau; \text{ wherein} \quad (15)$$

Vin is the DC link voltage; and
Vo is the output voltage for the LEDs. Vo can be calculated using equation (16):

$$Vo = Vled \cdot Num_{leds}; \text{ wherein} \quad (16)$$

Vled is the LED forward voltage drop; and
$Num_{leds}$ is the number of series connected LEDs.
Finding the integral of equation (15) results in equation (17):

$$i_{Lon}(t) = \frac{1}{Lf} \cdot (Vin - Vo) \cdot t + C \quad (17)$$

Evaluating the integration constant C at the beginning and end of the turn-on cycle of switch 96 results in two solutions as represented by equations (18) and (19):

$$i_{Lon}(0) = C = I_1; \text{ wherein} \quad (18)$$

$I_1$ is the minimum inductor current.

$$i_{Lon}(DTs) = C = Ipk - \frac{1}{Lf} \cdot (Vin - Vo) \cdot D \cdot Ts; \quad (19)$$

wherein

D is the operational duty cycle;
Ts is the switching period of the DC-DC converter; and
Ipk is the maximum inductor current.

During turn-off of switch 96, a function for current $i_{Loff}$ can be represented using equations (20)-(22):

$$v_{Loff}(t) = Lf \cdot \frac{d}{dt} i_{Loff}(t) \quad (20)$$

Taking the integral of both sides of equation (20) results in equation (21):

$$i_{Loff}(t) = \frac{1}{Lf} \cdot \int_0^t (-Vo) dt \quad (21)$$

Finding the integral of equation (21) results in equation (22):

$$i_{Loff}(t) = \frac{-Vo}{Lf} \cdot t + C \quad (22)$$

Evaluating the integration constant C at the beginning and end of the turn-off cycle of switch 96 results in two solutions as represented by equations (23) and (24):

$$i_{Loff}(0) = C = Ipk \quad (23)$$

$$i_{Loff}[(1-D) \cdot Ts] = C = I_1 - \left[\frac{-Vo}{Lf} \cdot (1-D) \cdot Ts\right] \quad (24)$$

An expression for the average inductor current $I_L$ current can be represented by equation (25):

$$I_L = \frac{1}{Ts} \cdot \left[\int_0^{D \cdot Ts} i_{Lon}(t) dt + \int_0^{(1-D) \cdot Ts} i_{Loff}(t) dt\right] \quad (25)$$

Substituting equation (17) (using the integration constant from equation (18)) and equation (22) (using the integration constant from equation (24)) into equation (25) results in equation (26):

$$I_L = \frac{1}{Ts} \cdot \left[\begin{array}{l} \int_0^{D \cdot Ts} \left[\frac{1}{Lf} \cdot (Vin - Vo) \cdot t + I_1\right] dt + \\ \int_0^{(1-D) \cdot Ts} \left[\frac{-Vo}{Lf} \cdot t + I_1 - \left[\frac{-Vo}{Lf} \cdot (1-D) \cdot Ts\right]\right] dt \end{array}\right] \quad (26)$$

Substituting Vo/Vin for the duty cycle D and solving for $I_1$ results in an equation (27):

$$I_1 = \frac{1}{2} \cdot \frac{2 \cdot I_L \cdot Vin \cdot Lf - Vo \cdot Ts \cdot Vin + Vo^2 \cdot Ts}{Vin \cdot Lf} \quad (27)$$

Setting equation (27) equal to 0 and solving for Lf results in a value for inductor Lf that will provide inductor current operating at the boundary between discontinuous conduction mode and continuous conduction mode as represented by equation (28):

$$Lf = \frac{-1}{2} \cdot Vo \cdot Ts \cdot \frac{-Vin + Vo}{I_L \cdot Vin} \quad (28)$$

Selecting an inductor value Lf that is larger than the value calculated by equation (28) can permit current regulator 32 to provide inductor current for maintaining continuous conduction mode. In other embodiments, inductor value Lf may be selected so that current regulator 18 is in discontinuous conduction mode.

For instance, if the maximum DC link voltage Vin is 400 V, maximum output voltage for the LEDs Vo is 117 V, the desired average LED current $I_L$ is 0.35 A, and the switching period of the converter $T_s$ is 0.01 ms, will result in an inductor value Lf of 1200 uH. One or more inductors can be used to realize the Lf inductor value in current regulator power section 32. For example, two inductors connected in series each having a value of 750 uH can be sufficient to meet an inductor value Lf of 1200 uH. Other suitable inductor values Lf and techniques for determining suitable inductor values Lf are also available.

The average for the average current $I_L$ from equation (25) can also be used to calculated the peak inductor current Ipk. Substituting equation (17) (using the integration constant from equation (19)) and equation (22) (using the integration constant from equation (23)) into equation (25) results in equation (29):

$$I_L = \quad (29)$$

$$\frac{1}{Ts} \cdot \left[\int_0^{D \cdot Ts} \left[\frac{1}{Lf} \cdot (Vin - Vo) \cdot t + Ipk - \left[\frac{1}{Lf} \cdot (Vin - Vo) \cdot D \cdot Ts\right]\right] dt + \int_0^{(1-D) \cdot Ts} \left[\frac{-Vo}{Lf} \cdot t + Ipk\right] dt\right]$$

Substituting Vo/Vin for the duty cycle D and solving for Ipk results in an equation (30):

$$Ipk = \frac{1}{2} \cdot \frac{2 \cdot I_L \cdot Vin \cdot Lf + Vo \cdot Ts \cdot Vin - Vo^2 \cdot Ts}{Vin \cdot Lf} \quad (30)$$

When switch 96 is closed, current controller 102 monitors the current through LEDs 20 by measuring the voltage drop across sense resistors 108, 110, 112, 114, 116, 118 and 120. This current feedback IswFbk can be fed through a first order RC filter composed of feedback filter resistor 122 and feedback filter capacitor 124. A time constant τ can be calculated for the current feedback using equation (31):

$$\tau = \frac{1}{N \cdot F_c}; \quad (31)$$

wherein

N is a constant indicating the magnitude of τ as compared to the switching period of the DC-DC converter;
τ is the time constant for the current feedback; and
$F_c$ is the switching frequency of the power converter.

In conjunction with equation (31), values for resistor 122 and capacitor 124 can be calculated using equation (32):

$$\tau = Rf \cdot Cf \quad (32)$$

After passing through feedback filter resistor 122 and feedback filter capacitor 124, current feedback is fed to current controller 102, which can provide a pulse width modulated (PWM) control signal through a gate resistor 104 to switch 96.

Figure 3:
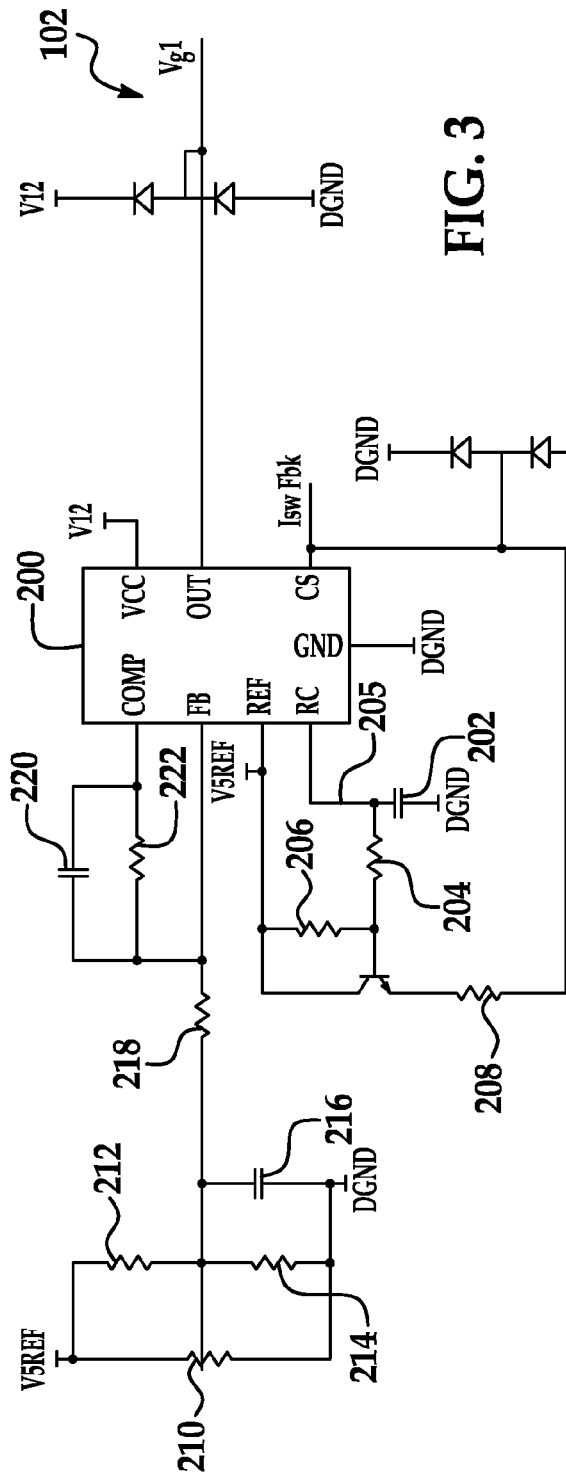
FIG. 3 is a circuit schematic of a current controller used in the power converter of FIG. 2.

As illustrated in FIG. 3, current controller 102 can be realized by an IC 200 that can control the average LED current $I_L$ by comparing the current feedback to an internal reference. In response to the current feedback, current controller 103 provides a PWM control signal through gate resistor 104 to the gate of switch 96. According to techniques such as that described in UCC3800 BiCMOS Current Mode Control ICs, which is incorporated herein in its entirety by reference, the oscillator frequency, voltage reference V5REF and compensation waveform can be configured to provide the appropriated output Vg1 for driving the gate of switch 96.

Generally, as shown in FIG. 3, the oscillator frequency can be configured to, for example, 100 kHz by selecting appropriate values for a timing capacitor 202 and serially connected timing resistors 204 and 205. Timing resistors 204 and 205 can be connected between voltage reference V5REF and an RC input of IC 200. Alternatively, timing resistors may be implemented using a single resistor, multiple resistors in series, multiple resistors in parallel, or any other suitable series or parallel combination of resistors. Timing capacitor 202 can be connected between the RC input and a digital ground DGND.

For example, a sawtooth waveform can be generated by IC 200. The oscillator waveform can be generated by a ramp up waveform and a ramp down waveform represented by equations 33 and 34, respectively:

$$Vrmp_{up}(t) = Vlow_{th} + Vref \cdot \left(1 - e^{\frac{-t}{R_T \cdot C_T}}\right); \quad (33)$$

wherein $Vrmp_{up}(t)$ is the ramp up interval;
t is the time;
$Vlow_{th}$ is the low oscillator threshold voltage;
Vref is the reference voltage V5REF;
$R_T$ is the timing resistor; and
$C_T$ is the timing capacitor.

$$Vdwn_{up}(t) = Vhi_{th} \cdot Vref \cdot e^{\frac{-t}{Rd \cdot C_T}}; \quad (34)$$

wherein $Vrmp_{dwn}(t)$ is the ramp down interval;
$Vhi_{th}$ is the high oscillator threshold voltage; and
Rd is the discharge current of the timing capacitor.

Substituting $Vhi_{th}$ for $Vrmp_{up}(t)$ in equation (33) and solving equation (33) for time t results in the time to ramp up to the high oscillator threshold voltage as represented by equation (35):

$$t_{up}(R_t, C_T) = -\ln\left(\frac{-Vhi_{th} + Vlow_{th} + Vref}{Vref}\right) \cdot R_t \cdot C_T; \quad (35)$$

wherein $t_{up}$ is the time to ramp up to the high oscillator threshold voltage. Similarly, substituting $Vlow_{th}$ for $Vrmp_{dwn}(t)$ in equation (34) and solving equation (34) for time t results in the time to ramp down to the low oscillator threshold voltage as represented by equation (36):

$$t_{dwn}(C_T) = -\ln\left(\frac{Vlow_{th}}{Vhi_{th}}\right) \cdot Rd \cdot C_T; \quad (36)$$

wherein $t_{up}$ is the time to ramp up to the high oscillator threshold voltage.

Accordingly, from equations (33)-(36) the oscillator waveform can be represented by equation (37):

$$Vosc(t) = \begin{vmatrix} Vrmp_{up}(t) \text{ if } t \leq t_{up}(R_T, C_T) \\ Vrmp_{dwn}(t - t_{up}(R_T, C_T)) \text{ if } t \geq t_{up}(R_T, C_T) \end{vmatrix}; \quad (37)$$

wherein

Vosc(t) is the oscillator waveform.

Current controller 102 can also include a slope compensation scheme for providing constant current regulation. Preferably, the slope of the oscillator waveform Vosc(t) should be constant so as to not affect the slope compensation technique. The slope compensation scheme can be realized by a transistor 206 and compensation resistor 208 to buffer the oscillator waveform generated from timing capacitor 202. Transistor 206 and compensation resistor 208 may cause the ramp up waveform $Vrmp_{up}(t)$ to have a different shape due to, for example, current gain of transistor 206. For example, still referring to FIG. 3, the altered ramp up waveform can be represented by equation (38):

$$Vrmp_{up2}(t) = \\ -R_e \cdot \beta \cdot \frac{R_{T1} \cdot Vbe + Vbe \cdot R_{T2} - R_{T2} \cdot Vref - R_{T1} \cdot Vrmp_{up}(t)}{R_{T1} \cdot R_e \cdot \beta + R_{T1} \cdot R_{T2} \cdot R_e \cdot \beta}; \quad (38)$$

wherein $Vrmp_{up2}$ is the altered ramp up waveform as a function of time t;
$R_e$ is the emitter resistance of transistor 206.
β is the current gain of transistor 206;
Vbe is the base-emitter voltage of transistor 206;
$R_{T1}$ and $R_{T2}$ are the timing resistors 204 and 205;
Vref is the reference voltage V5REF; and
$Vrmp_{up}(t)$ is the ramp up interval as a function of time t.

Preferably, the current feedback at the minimum DC link voltage $Vlink_{min}$ and maximum voltage $Vlink_{max}$ will be the same. Using, for example, superposition, feedback current can be represented by equation (39):

$$i_{Lfbk} = \frac{i_L(t) \cdot Rs \cdot Rcmp}{Rs + Rcf + Rcmp} + Vrmp_{up2}(t) \cdot \frac{Rs + Rcf}{Rs + Rcf + Rcmp}; \quad (39)$$

wherein $i_{Lfbk}$ is the feedback current;
$i_L(t)$ is inductor current as a function of time t;
Rs is the current sense resistor;
Rcmp is the compensation resistor;
Rf is the feedback filter resistor; and
$Vrmp_{up2}(t)$ is the altered ramp up interval waveform as a function of time t.

If the inductor value Lf calculated in equation (28) provides a peak value of current feedback that is over a preferred peak value of current feedback, such as 0.5 A, the value of the inductor Lf can be varied so that the peak value does not exceed this preferred value. Specifically, the peak values of the current at the minimum DC link voltage $Vlink_{min}$ and the maximum voltage $Vlink_{max}$, can be calculated using equation (30). Further, the peak ramp waveform values at the minimum DC link voltage $Vlink_{min}$ and the maximum voltage $Vlink_{max}$ can be calculated using equation (38). Accordingly, substituting these values into equation (39) can give equations for the peak feedback current at the minimum and maximum DC link voltage operating points as represented by equations (40) and (41).

$$i_{Lfbk\_pk} = \frac{i_{L\_pk1} \cdot Rs \cdot Rcmp}{Rs + Rcf + Rcmp} + Vrmp_{iLpk1} \cdot \frac{Rs + Rcf}{Rs + Rcf + Rcmp}; \quad (40)$$

wherein $l_{Lfbk\_pk}$ is the peak feedback current at the maximum voltage $Vlink_{max}$;
$i_{L\_pk1}$ is the peak value of the inductor current at the maximum voltage $Vlink_{max}$; and
$Vrmp_{Lpk1}$ is the peak ramp waveform value at the maximum voltage $Vlink_{max}$ $$i_{Lfbk\_pk} = \frac{i_{L\_pk2} \cdot Rs \cdot Rcmp}{Rs + Rcf + Rcmp} + Vrmp_{iLpk2} \cdot \frac{Rs + Rcf}{Rs + Rcf + Rcmp}; \quad (41)$$

wherein $i_{Lfbk\_pk}$ is the peak feedback current at the minimum voltage $Vlink_{min}$;
$i_{L\_pk2}$ is the peak value of the inductor current at the minimum voltage $Vlink_{min}$; and
$Vrmp_{iLpk2}$ is the peak ramp waveform value at the minimum voltage $Vlink_{min}$.

Setting equations (40) and (41) equations equal to each other gives a peak value of current feedback that is the same at the minimum and maximum DC link voltage operating points. From these equations, appropriate values for current sense resistor 108 (Rs) and compensation resistor 208 (Rcmp) can be determined. Power loss calculations can be performed, by assuming worst case RMS currents, for current sense resistor 108 and compensation resistor 208. However, power loss may be minimal in, for example, compensation resistor 208 so that a value, such as 7.5 k, can be utilized without a power loss analysis. Other suitable compensation resistor values and techniques for selecting compensation resistor values are also available.

A realizable value and a number of resistors can be chosen for current sense resistor by determining the worst case power loss. One technique to determine the worst case power loss is to assume that the ramp waveform $Vrmp_{up2}(t)$ is not added to the feedback current. The scalar for the current can be represented by equation (42) and the limited peak current can be represented by equation (43)

$$K_{ifbk} = \frac{Rs \cdot Rcmp}{Rs + Rcf + Rcmp}; \quad \text{wherein} \quad (42)$$

$K_{ifbk}$ is the scalar for the feedback current. The peak current that $$I_{lim} = \frac{Voref_{max}}{K_{ifbk}}; \quad \text{wherein} \quad (43)$$

$I_{lim}$ is the peak current limited by the maximum voltage reference in the IC current controller; and
$Voref_{max}$ is the maximum voltage reference in the in the IC current. Accordingly, the worst case power loss can be $$P_{Rs} = (\sqrt{D_{max}} \cdot I_{lim})^2 \cdot Rs; \text{ wherein} \quad (44)$$

$P_{Rs}$ is the power rating for the current sense resistor Rs;
Dmax is the maximum duty cycle;
$I_{lim}$ is the peak current. As such, a suitable number of resistors can be implemented in lieu of one current sense resistor 108 such that the power rating of current sense resistor 108 is not exceeded. For example, 7 resistors can be connected in parallel, each having a value of 2.7Ω. Other suitable current resistor values and techniques for selecting current resistor values are also available.

UCC3800 BiCMOS Current Mode Control ICs, referenced above, also provides a technique to set up the internal current reference of IC 200. Still referring to FIG. 3, a potentiometer 210 is connected between voltage reference V5REF and DGND. Connected in parallel to potentiometer 210 are resistors 212 and 214. Capacitor 216 is connected in parallel to resistor 214. Resistor 218 has one end connected to capacitor 216 and the other end connected to a point connecting the inverting input of the error amplifier (FB) as well as the output of the error amplifier (COMP), which is connected through capacitor 220 and resistor 222. Other suitable current resistor values and techniques for selecting current resistor values are also available.

Figure 5:
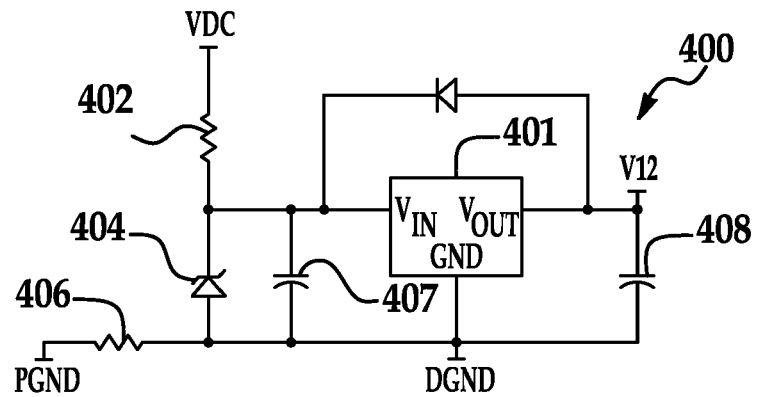
FIG. 5 is a circuit schematic of a voltage regulator used in the power converter of FIG. 2.

Referring to FIG. 5, IC 200 can be powered by providing a voltage reference V12 to pin VCC by using power circuitry 400. Referring to FIG. 5, voltage reference V12 is generated through IC 401. IC 401 can be a positive voltage regulator such as Texas Instruments Part No. UA78M12. DC link voltage VDC is provided through a bias resistor 402 to create a voltage potential Vz. A zener diode 404 is connected to a point between bias resistor 402 and $V_{IN}$ and to one end of a resistor 406 to absorb excess voltage. The other end of resistor 406 is connected to PGND. Vz is filtered by an input filter capacitor 406 and is fed into the input of IC 401 (VIN).

VIN can also be fed from the drain-source voltage of switch 96 through a boost resistor 126. Accordingly, the drain source-voltage of switch 96 may provide the power to permit control circuits of power converter 18 to operate over a wide range. The output of IC 401 provides the voltage reference V12 filtered by an output filter capacitor 408. Other suitable techniques, components and configurations for powering IC 200 are also available.

Returning to FIG. 1, selection of switch 96 can be accomplished by, for example, estimating the maximum power loss of the switch using equation (45):

$$Ptot = Psw + Pcnd; \text{ wherein} \quad (45)$$

Ptot is the total power loss of the switch;
Psw is the switching loss of the switch; and
Pcnd is the conduction loss of the switch. The maximum switching loss Psw of switch 96 can be calculated using equation (46):

$$Psw = Fs \cdot \left( \frac{1}{2} \cdot Vlink_{max} \cdot I_L \cdot t_r + \frac{1}{2} \cdot Vlink_{max} \cdot I_L \cdot t_f \right); \quad (46)$$

wherein

Fs is the switching frequency of the converter;
$Vlink_{max}$ is the maximum DC link voltage
$I_L$ is the average inductor current;
$t_r$ is the switching rise time; and
$t_f$ is the switching fall time. Assuming that switch 96 is continuously on at the highest temperature, the maximum conduction loss Pcnd of switch 96 can be estimated using equation (47):

$$Pcnd = I_L^2 Rds_{on\_max}; \text{ wherein} \quad (47)$$

$Rds_{on\_max}$ is the maximum resistance between the drain and the source when the switch is closed. The resistance $Rds_{on\_max}$ can also be scaled by a temperature scale factor to obtain a more accurate conduction loss Pcnd.

If switch 96 were to operate without a heatsink, the temperature rise of switch 96 due to power dissipation can be estimated using equation (48):

$$TempRise = Ptot \cdot \theta_{ja}; \text{ wherein} \quad (48)$$

TempRise is the temperature rise of the switch; and
$\theta_{ja}$ is the junction to ambient thermal resistance of the switch. If switch 96 does not operate within its proper temperature limits, a heat sink may be used in conjunction with switch 96. If a heat sink is used, the thermal resistance of the heat sink can be estimated such that switch 96 can operate within its proper temperature limits. The thermal resistance of the heat sink can be estimated using equation (49):

$$\theta_{ca} = \frac{\Delta T}{Ptot} - \theta_{jc}; \text{ wherein} \quad (49)$$

$\theta_{ca}$ is the case to ambient thermal resistance of the heat sink;
$\theta_{ja}$ is the junction to case thermal resistance of the switch; and
$\Delta T$ is the change between the maximum temperature of the switch and the ambient temperature.

Switch 96 may be any suitable controllable switching device such as a BJT, IGBT, standard FET, etc., that can be controlled through application of a control signal. An example of a suitable switch 96 is STMicroelectronics N-Channel Power MOSFET Part No. STFV4N150. Other suitable switching devices and techniques for determining suitable switching devices are also available.

The rise time rate of change of current di/dt and rise time rate of change of voltage dv/dt of switch 96 can change depending on the value of gate resistor 104. Equation (50) represents an estimation of turn-on di/dt:

$$didt_{on} = \frac{Id}{t_{rsw}}; \text{ wherein} \quad (50)$$

$didt_{on}$ is the rise time rate of change of current of the switch;
Id is the load current during the switching time test circuit; and
$t_{rsw}$ is the rise time scaled by the gate resistor value. The rise time scaled by the gate resistor value $t_{rsw}$ can be calculated using equation (51):

$$t_{rsw} = \frac{R}{Rg_{avg}} \cdot t_r; \text{ wherein} \quad (51)$$

R is the gate resistor value;
$t_r$ is the rise time of the switch;
$Rg_{avg}$ is the minimum average resistor value to achieve the rise and fall times of the switch. The minimum average resistor value $Rg_{avg}$ can be calculated using equation (52):

$$Rg_{avg} = \frac{\frac{Vgs - Vgs_{th}}{\frac{Qgs}{t_r}} + \frac{Vgs - Vgs_{th}}{\frac{Qgs}{t_r}}}{2}; \text{ wherein} \quad (52)$$

Vgs is the gate to source voltage of the switch;
$Vgs_{th}$ is the gate to source threshold voltage of the switch;
Qgs is the gate to source charge of the switch;
$t_r$ is the rise time of the switch; and
$t_f$ is the fall time of the switch.

The rise time rate of change of voltage dv/dt of switch 96 can be estimated using equation (53):

$$dvdt_{on} = \frac{Vdd \cdot 80\%}{t_{rsw}}; \text{ wherein} \quad (53)$$

$dvdt_{on}$ is the rise time rate of change of voltage of the switch;
Vdd is the DC link voltage during the switching time test circuit; and
$t_{rsw}$ is the rise time scaled by the gate resistor value (as calculated by equation (51)).

Figure 7A:
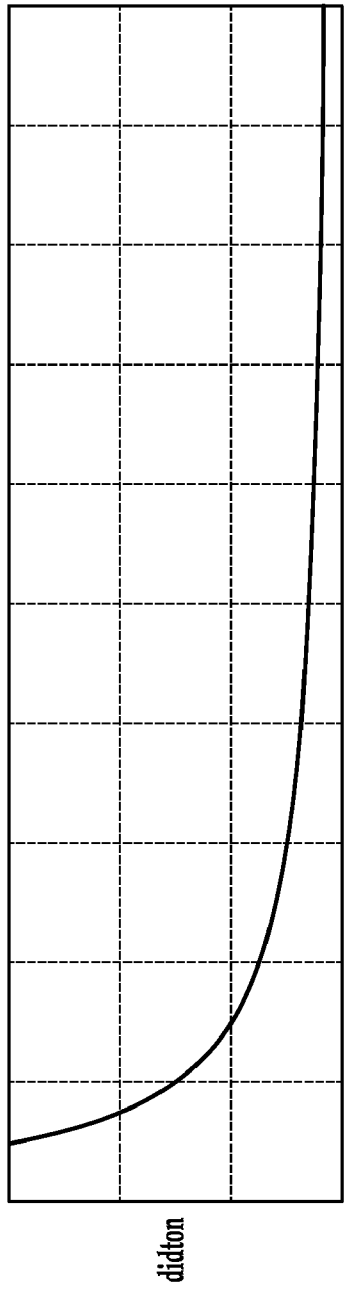
FIG. 7A is a circuit simulation waveform of switch turn-on di/dt changing as a function of a gate drive resistor value from the power converter of FIG. 2.
Figure 7B:
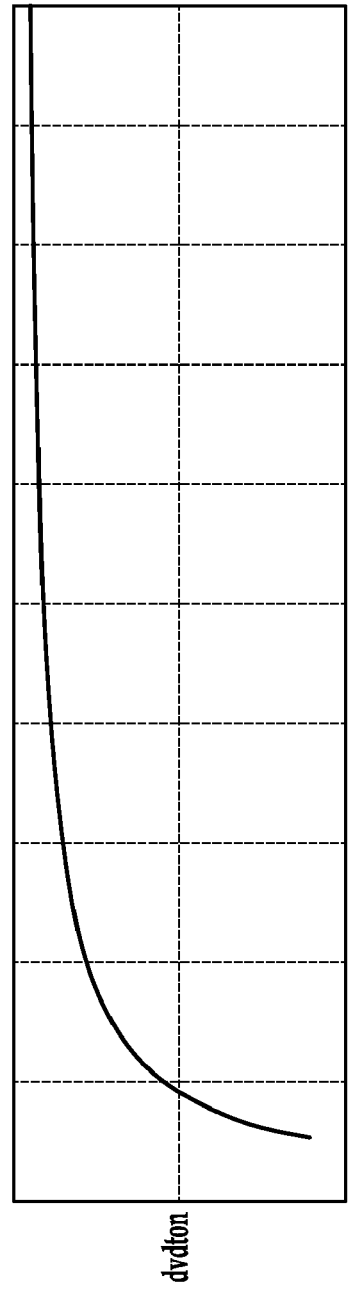
FIG. 7B is a circuit simulation waveform of switch turn-on dv/dt changing as a function of a gate drive resistor value from the power converter of FIG. 2.

FIGS. 7A and 7B illustrate di/dt and dv/dt, respectively, as a function of different values of gate resistor 104. Preferably, a value for gate resistor 104 is chosen so that both di/dt and dv/dt are relatively constant. Gate resistor 104 may be implemented using a single resistor, multiple resistors in series, multiple resistors in parallel, or any other suitable series or parallel combination of resistors. For example, gate resistor may be implemented using a combination of two 100 ohm resistors. Other suitable gate resistor values and techniques for selecting gate resistor values are also available.

A shunt voltage regulator circuit 34 is optionally coupled in parallel to the current regulator power section 31. Shunt voltage regulator 34 as shown clamps the DC link voltage VDC so it does not exceed, for example, a maximum DC link voltage $Vlink_{max}$. The voltage clamping can be accomplished by, for example, PWM of a power switch 130 to provide a controllable power loss in a shunt regulator load 132 (e.g. one or more resistors). In other words, shunt voltage regulator 34 draws increasing current from the ballast 16 through the rectifier 28 and main filter capacitor 30 and wastes that power in the shunt regulator load 132 if the voltage exceeds a preset value. This prevents the output voltage from the ballast 16 from rising excessively by having an amount of power dissipation. Accordingly, the operating point (e.g. 120 V) of light 10 can be controlled based on the impedance of shunt regulator load 132.

As one non-limiting example, the normal operating point of replacement lamp 30 can be around 120V and 220 mA. Of course, other replacement lamps can operate at different operating points. When replacement lamp 30 is operating from ballast 34, the power in lamp 30 increases as the current in lamp 30 decreases, and vice versa, because the operating point voltage of lamp 30 is below the maximum power point of the ballast.

A first end of shunt regulator load 132 is connected to the cathode of recirculation diode 98 the second end of shunt regulator load 132 is connected to a first end of power switch 130. The second end of power switch 130 is connected to PGND. Further, a recirculation diode 134 is connected in parallel to shunt regulator load 132. While shunt voltage regulator 34 functions in part to protect components from high voltages, it also causes power dissipation through a shunt regulator load 132. The resistance of shunt regulator load can be calculated by using equation (54):

$$Rload = \frac{Vlink_{max}^2}{Po_{max}}; \text{ wherein} \tag{54}$$

$Vlink_{max}$ is the maximum DC link voltage; and
$Po_{max}$ is the maximum output power of the LEDs. Shunt regulator load 132 may be implemented with one resistor, multiple resistors in series, multiple resistors in parallel, or any other suitable series or parallel combination of resistors.

A voltage controller 136 provides a PWM control signal through gate resistor 138 to the gate of switch 130. A suitable value for gate resistor 138 can be determined by using techniques similar to that described in connection with gate resistor 104 of current controller 102. Further, the type of switch 130 can be chosen using techniques similar to that described in connection with switch 96 of current controller 102. Although gate resistor 138 is shown as one resistor, gate resistor may be implemented multiple resistors in series, multiple resistors in parallel, or any other suitable series or parallel combination of resistors.

The embodiments of the present invention are not limited to shunt voltage regulator circuit 34. For example, a linear regulator in the form of an integrated circuit can be used in lieu of or in addition to shunt voltage regulator circuit 34. Of course, other regulator circuits are also available.

Figure 4:
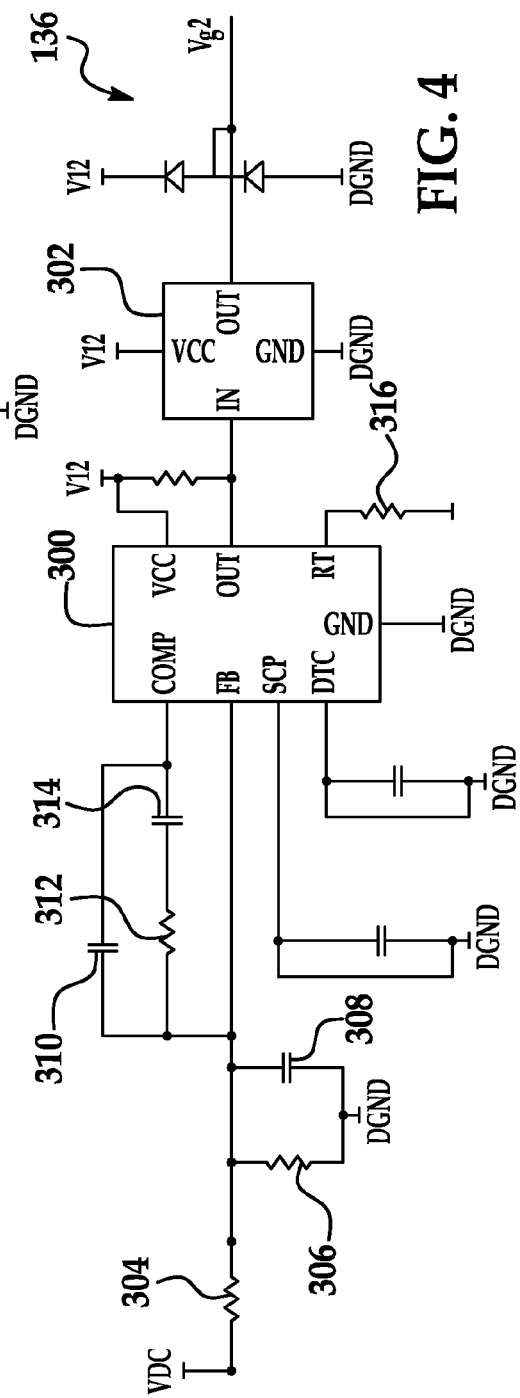
FIG. 4 is a circuit schematic of a voltage controller used in the power converter of FIG. 2.

Referring to FIG. 4, voltage controller 136 can be realized by an IC 300 that can control the voltage to shunt regulator load 32. The DC link voltage VDC is fed into a resistor divider network, which can include resistors 304 and 306. Each resistors 304 and 306 may be implemented by any suitable number of resistors and may be in any suitable series or parallel configuration. For example, six resistors can be serially and parallely connected in lieu of one resistor 304 so that the power rating of each of the resistors is not exceeded. A filtering capacitor is connected in parallel to resistor 306, each having one end connected to ground. At the opposing end of capacitor 308 is connected to the inverting input of the error amplifier (FB). the ends of capacitor. The opposing end of capacitor 308 is also connected to the output of the error amplifier (COMP), which is connected through a capacitor 310 in parallel with a resistor 312 connected in series with a capacitor 314.

The oscillator frequency can be configured to, for example, 100 kHz by selecting appropriate values for a timing resistors 316. Timing resistor 316 can be connected between RT and GND. Timing capacitor 202 can be connected between the RC input and a digital ground DGND.

IC 200 can be receive power (VCC) similar to the techniques described above in connection with IC 200 of FIG. 3. The short-circuit protection pin (SCP) and dead-time control pin (DTC) can be grounded.

The output driver may not have enough drive capability to supply the proper gate drive through gate resistor 138 to the gate of switch 130. Accordingly, an optional driver IC 402 can be connected to the output of IC 300 (OUT) to supply a suitable gate voltage drive. One suitable driver is Texas Instruments Mosfet Driver Part No. TPS2829. Other suitable drivers are also available.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An illumination device including LEDs for connection to an existing fluorescent lamp fixture including a conventional ballast, the ballast configured to provide a current signal, the illumination device comprising:
    protection circuitry configured to protect the illumination device from the ballast current signal;
    a full-wave rectifier electrically coupled to the circuit protection means and configured to produce a rectified voltage output;
    a smoothing filter electrically coupled to the full wave rectifier and configured to produce a smoothed rectified voltage output; and
    a current regulator power circuit electrically coupled to the smoothing filter and the LEDS, the current regulator power circuit including:
        a first switching element configured to operate in response to a first pulse width modulated (PWM) ON/OFF control signal, the first switching element delivering current to the LEDs in response to the ON control signal and the first switching element not delivering current to the LEDs in response to the OFF control signal;
        a current controller electrically coupled to a gate of the first switching element, the current controller configured to generate the first PWM control signal;
        a current sense resistor electrically coupled to the first switching element and configured to sense the current through the LEDS, wherein the sensed current is fed back to the current controller;
    a load resistor; and
    a shunt voltage regulator circuit electrically coupled to the current regulator power circuit and the load resistor and configured to dissipate power through the load resistor when the rectified output voltage is greater than a maximum voltage.

2. The illumination device of claim 1, wherein the shunt voltage regulator circuit further comprises:
    a second switching element configured to operate in response to a second pulse width modulated (PWM) ON/OFF control signal, the second switching element delivering voltage to the load resistor in response to the ON control signal and the second switching element not delivering voltage to the load resistor in response to the OFF control signal; and a voltage controller electrically coupled to a gate of the second switching element, the voltage controller configured to generate the second PWM control signal.

3. The illumination device of claim 1, wherein the protection circuitry comprises at least one of:
an inrush protection circuit configured to limit inrush current from the ballast; and
a surge suppressor configured to suppress ballast voltage from the ballast.

4. The illumination device of claim 1, wherein the smoothing filter comprises:
at least one capacitor;
at least one discharge resistor electrically coupled in parallel to the at least one capacitor.

5. The illumination device of claim 1, wherein the current regulator power circuit further comprises:
at least one inductor in series with the LEDs.

6. The illumination device of claim 5, wherein the current regulator power circuit further comprises:
a recirculation diode electrically coupled in parallel with the at least one inductor and the LEDs.

7. A method of supplying power to an illumination device including LEDs and connected to an existing fluorescent lamp fixture including a conventional ballast, the method comprising:
receiving a current signal from the conventional ballast;
protecting the illumination device from the received current signal;
rectifying the received current signal to produce a rectified voltage output;
sensing current through the LEDs;
generating a pulse width modulated (PWM) control signal from a current control circuit based on the sensed current;
supplying current to the LEDs in response to the PWM control signal so that the LED current reaches an average LED current;
regulating the voltage in the illumination device so that the rectified voltage output does not exceed a maximum rectified voltage.

8. The method of claim 7, wherein the average LED current is determined based on the rectified voltage output and an output voltage of the LEDs.

9. The method of claim 7, wherein the PWM control signal is supplied to a switching element.

10. The method of claim 7, wherein protecting the illumination device further comprises at least one of:
limiting the current received from the conventional ballast; and
suppressing ballast voltage from the conventional ballast.

11. The method of claim 7, further comprising:
filtering the rectified current signal.

12. An illumination device including LEDs for connection to an existing fluorescent lamp fixture including a conventional ballast, the illumination device comprising:
means for receiving a current signal from the conventional ballast;
means for protecting the illumination device from the received current signal;
means for rectifying the received current signal to produce a rectified voltage output;
means for sensing the current through the LEDs;
means for generating a pulse width modulated (PWM) control signal from a current control circuit based on the sensed current;
means for supplying current to the LEDs in response to the PWM control signal so that the LED current reaches an average LED current; and
means for dissipating excess power through a load resistor when the rectified output voltage is greater than a maximum voltage.

13. The illumination device of claim 12, further comprising:
means for filtering the rectified current signal.

* * * * *